(12) United States Patent
Craft et al.

(10) Patent No.: US 10,493,523 B1
(45) Date of Patent: Dec. 3, 2019

(54) METHOD OF PRODUCING A CAST COMPONENT

(71) Applicant: WILLIAMS INTERNATIONAL CO., L.L.C., Walled Lake, MI (US)

(72) Inventors: Neil H. Craft, West Bloomfield, MI (US); Noah A. W. Mosberg, Ann Arbor, MI (US)

(73) Assignee: WILLIAMS INTERNATIONAL CO., L.L.C., Pontiac, MI (US)

( * ) Notice: Subject to any disclaimer, the term of this patent is extended or adjusted under 35 U.S.C. 154(b) by 210 days.

(21) Appl. No.: 15/423,673

(22) Filed: Feb. 3, 2017

Related U.S. Application Data

(60) Provisional application No. 62/291,148, filed on Feb. 4, 2016.

(51) Int. Cl.
*B22D 25/02* (2006.01)
*B22C 7/02* (2006.01)
(Continued)

(52) U.S. Cl.
CPC ............... *B22D 25/02* (2013.01); *B22C 7/02* (2013.01); *B22C 9/04* (2013.01); *B22C 9/082* (2013.01); *B22C 9/24* (2013.01); *B22D 27/15* (2013.01); *B33Y 10/00* (2014.12); *B33Y 80/00* (2014.12); *F27D 7/06* (2013.01); *F27D 11/06* (2013.01); *H05B 6/10* (2013.01); *F27D 2007/066* (2013.01)

(58) Field of Classification Search
CPC .......... B22D 25/02; B22D 27/15; B22C 7/02; B22C 9/04; B22C 9/082; B22C 9/24
See application file for complete search history.

(56) References Cited

U.S. PATENT DOCUMENTS 1,793,672 A    2/1931    Bridgman
1,920,638 A    8/1933    Driggs
(Continued)

FOREIGN PATENT DOCUMENTS

EP    2641674 A1    9/2013
EP    2818264 A1    12/2014
(Continued)

*Primary Examiner* — Kevin P Kerns
*Assistant Examiner* — Steven S Ha
(74) *Attorney, Agent, or Firm* — Raggio & Dinnin, P.C.; Kurt L. VanVoorhies

(57) ABSTRACT

An integrally-formed metal-casting mold loaded with a solid-metal ingot in an ingot-cup portion thereof is heated in a furnace under vacuum to a temperature sufficient to melt the solid-metal ingot. The ingot-cup portion is operatively coupled to a component-mold portion of the mold via a funnel portion thereof, either directly or through a riser portion operatively coupled to a base of the component-mold portion, which provides for feeding molten metal melted from the ingot to cast a part in the component-mold portion. Molten metal in excess of what is needed to cast the part flows either into the riser portion, or into a fluid conduit that extends above the component-mold portion. The molten metal may be fed to the component-mold portion through a molten-metal filter to reduce flow rate or remove contaminants. The mold may be formed either as an investment mold or directly by additive manufacturing.

26 Claims, 16 Drawing Sheets

(51) Int. Cl.
   *B22C 9/04*    (2006.01)
   *B22C 9/08*    (2006.01)
   *B22C 9/24*    (2006.01)
   *B22D 27/15*   (2006.01)
   *H05B 6/10*    (2006.01)
   *F27D 11/06*   (2006.01)
   *F27D 7/06*    (2006.01)
   *B33Y 10/00*   (2015.01)
   *B33Y 80/00*   (2015.01)

(56) References Cited

U.S. PATENT DOCUMENTS

| | | | |
|---|---|---|---|
| 2,214,976 A | 9/1940 | Stockbarger | |
| 2,368,719 A | 2/1945 | Miller | |
| 2,420,003 A | 5/1947 | Miller | |
| 2,594,998 A | 4/1952 | Rocco | |
| 3,633,648 A | 1/1972 | Barrow et al. | |
| 3,667,533 A | 6/1972 | Boucher et al. | |
| 3,712,368 A | 1/1973 | Phipps, Jr. et al. | |
| 4,580,613 A | 4/1986 | Miller et al. | |
| 4,612,969 A | 9/1986 | Burd et al. | |
| 4,718,940 A | 1/1988 | McPhillips | |
| 4,844,144 A | 7/1989 | Murphy et al. | |
| 5,161,602 A | 11/1992 | Chang et al. | |
| 5,204,055 A | 4/1993 | Sachs et al. | |
| 5,340,656 A | 8/1994 | Sachs et al. | |
| 5,387,380 A | 2/1995 | Cima et al. | |
| 5,718,279 A | 2/1998 | Satoh et al. | |
| 6,117,612 A | 9/2000 | Halloran et al. | |
| 6,289,969 B1 | 9/2001 | Outten et al. | |
| 6,397,922 B1 | 6/2002 | Sachs et al. | |
| 6,715,534 B1 | 4/2004 | Kablov et al. | |
| 6,932,145 B2 | 8/2005 | Frasier et al. | |
| 7,343,960 B1 | 3/2008 | Frasier et al. | |
| 7,377,305 B2 | 5/2008 | Frasier et al. | |
| 7,418,993 B2 | 9/2008 | Frasier et al. | |
| 7,551,977 B2 | 6/2009 | Schlienger et al. | |
| 7,779,890 B2 | 8/2010 | Frasier et al. | |
| 7,824,494 B2 | 11/2010 | Frasier et al. | |
| 7,963,402 B2 | 6/2011 | Juma | |
| 8,082,976 B2 | 12/2011 | Frasier et al. | |
| 8,087,446 B2 | 1/2012 | Frasier et al. | |
| 8,181,692 B2 | 5/2012 | Frasier et al. | |
| 8,550,144 B2 | 10/2013 | Frasier et al. | |
| 8,575,513 B2 | 11/2013 | Abdo et al. | |
| 8,636,496 B2 | 1/2014 | Das et al. | |
| 8,794,298 B2 | 8/2014 | Schlienger et al. | |
| 8,844,607 B2 | 9/2014 | Frasier et al. | |
| 8,851,151 B2 | 10/2014 | Frasier et al. | |
| 8,851,152 B2 | 10/2014 | Frasier et al. | |
| 8,939,193 B2 | 1/2015 | Stoyanov et al. | |
| 9,079,803 B2 | 7/2015 | Xu | |
| 9,403,322 B2 | 8/2016 | Das et al. | |
| 2001/0032713 A1 | 10/2001 | Penn et al. | |
| 2005/0279481 A1 | 12/2005 | Renkel et al. | |
| 2008/0142186 A1 | 6/2008 | Frasier et al. | |
| 2008/0202718 A1 | 8/2008 | Paul et al. | |
| 2009/0205800 A1* | 8/2009 | Bullied | B22C 9/04 164/137 |
| 2011/0094705 A1* | 4/2011 | Kelly | B22D 13/00 164/493 |
| 2012/0015797 A1 | 1/2012 | Schlienger et al. | |
| 2013/0277007 A1* | 10/2013 | Wellman | B22D 23/06 164/493 |
| 2014/0217647 A1 | 8/2014 | Pallari | |
| 2014/0284848 A9 | 9/2014 | Schlienger et al. | |
| 2015/0209860 A1 | 7/2015 | Withey et al. | |

FOREIGN PATENT DOCUMENTS

| | | |
|---|---|---|
| GB | 189522181 A | 3/1896 |
| GB | 1590480 A | 6/1981 |
| GB | 2515773 A | 1/2015 |
| WO | 2013102127 A2 | 7/2013 |
| WO | 2013102127 A3 | 7/2013 |
| WO | 2015112885 A1 | 7/2015 |

\* cited by examiner

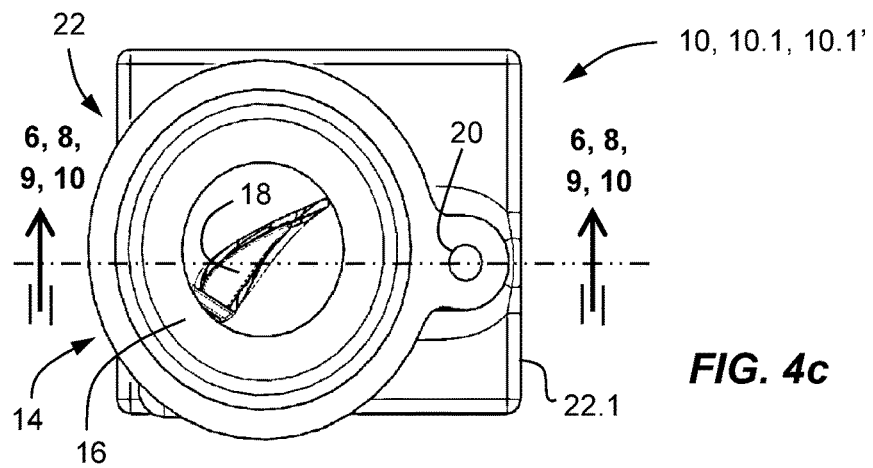
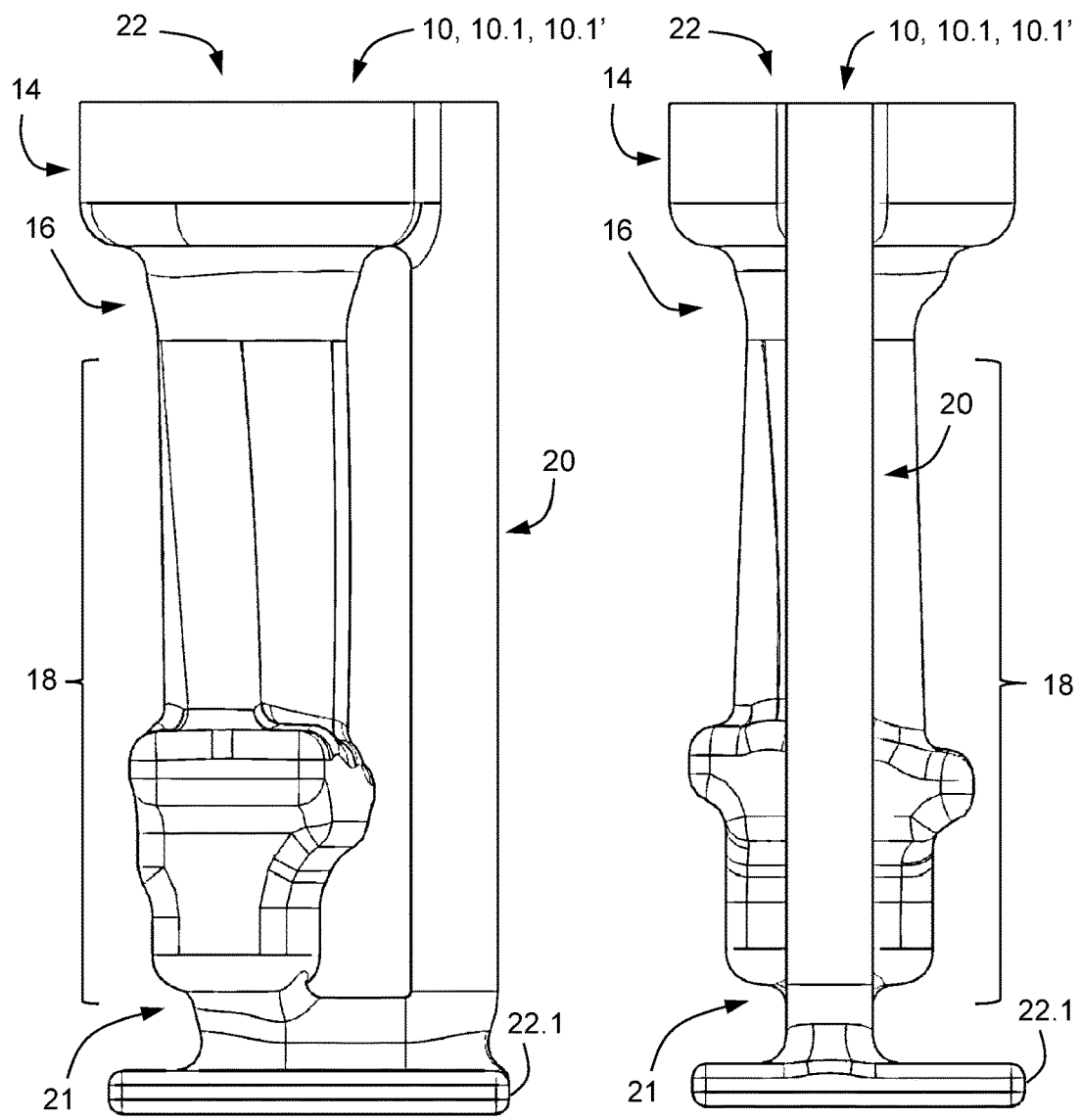
FIG. 4a  FIG. 4b

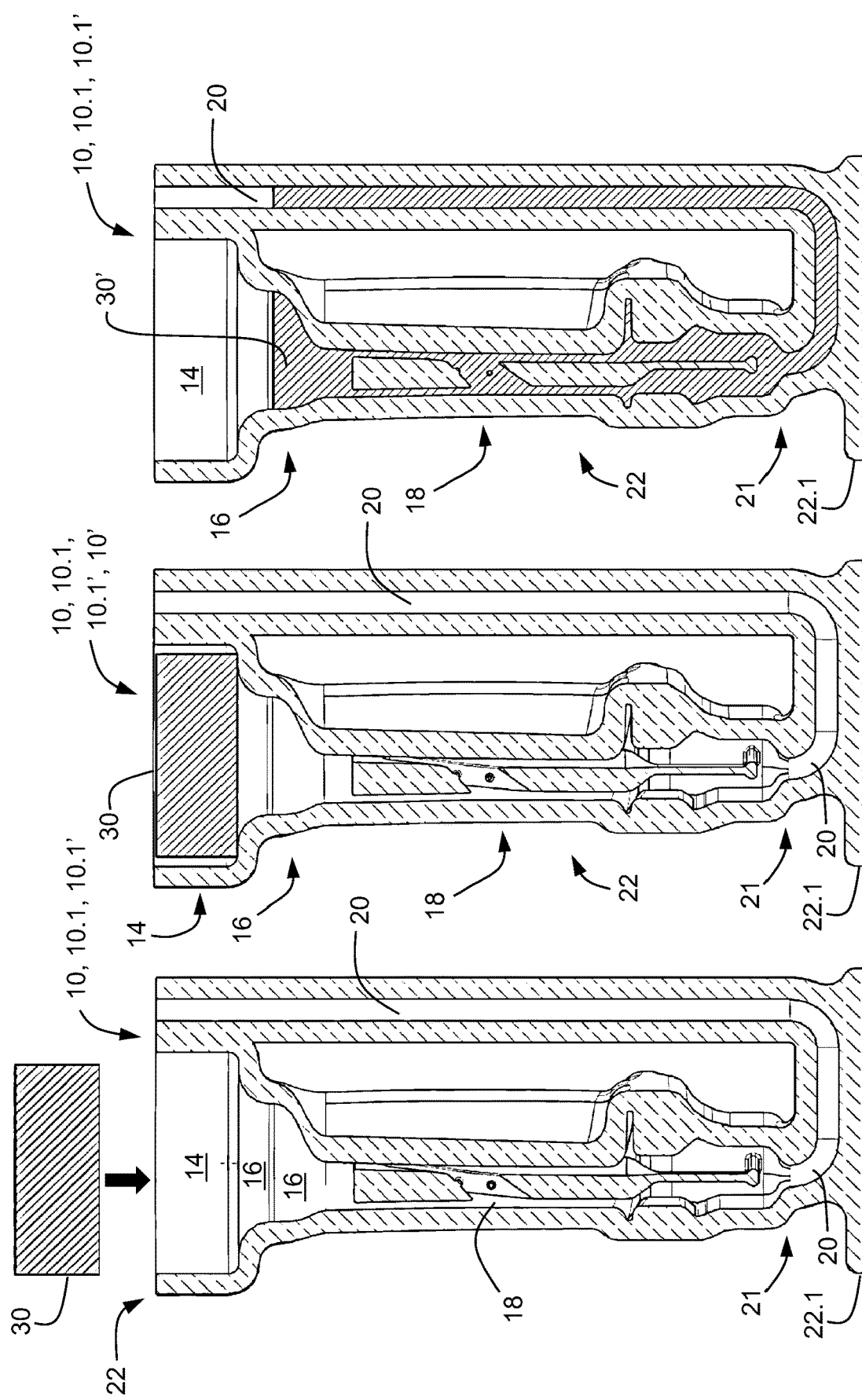

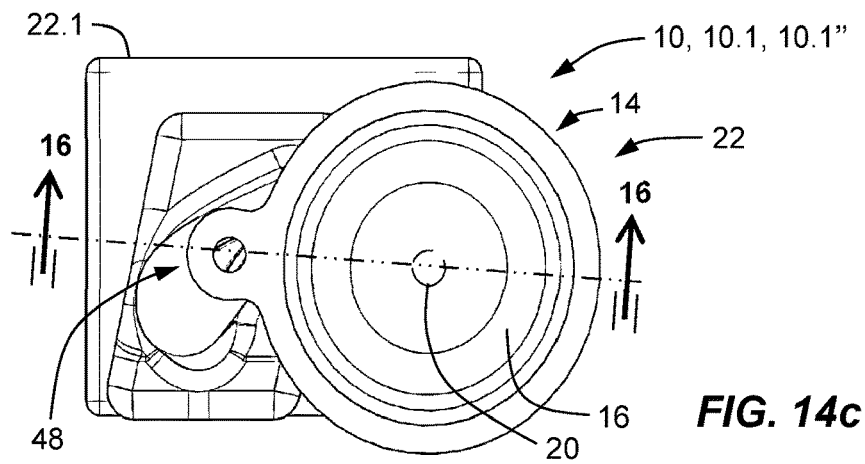
*FIG. 14c*
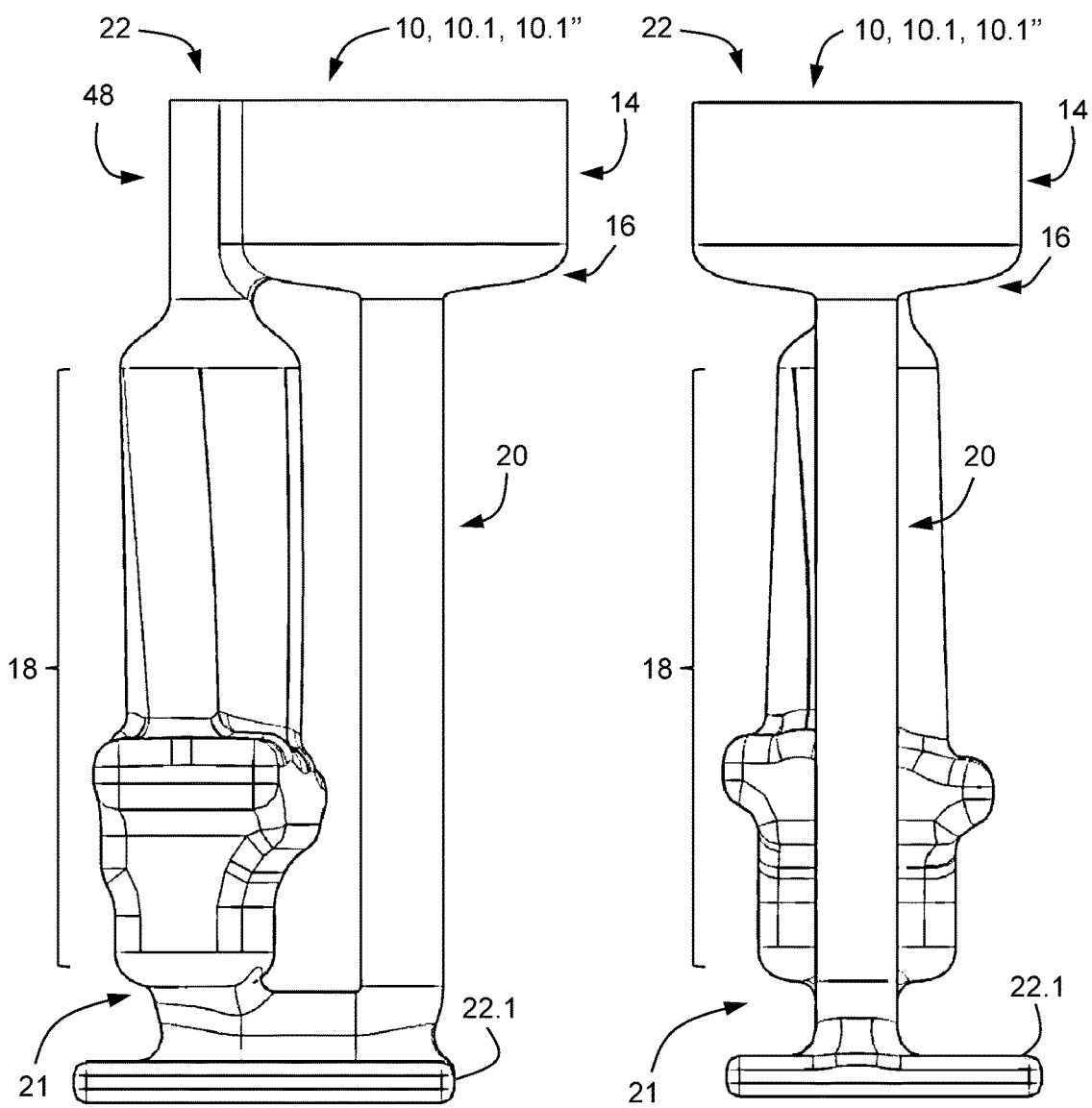
*FIG. 14a*          *FIG. 14b*

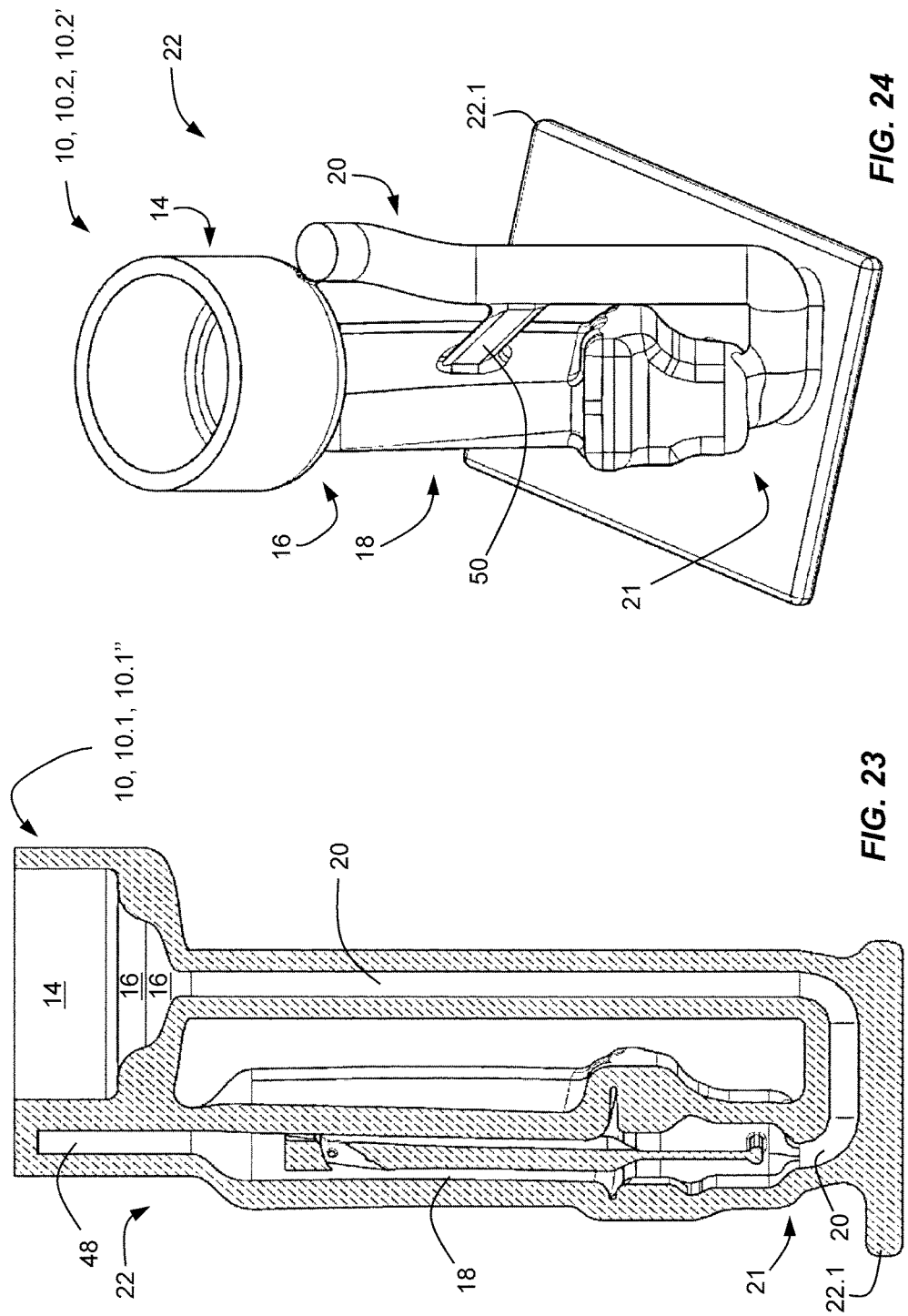

METHOD OF PRODUCING A CAST COMPONENT

CROSS-REFERENCE TO RELATED APPLICATIONS

The instant application claims the benefit of prior U.S. Provisional Application Ser. No. 62/291,148 filed on 4 Feb. 2016, which is incorporated by reference herein in its entirety.

BRIEF DESCRIPTION OF THE DRAWINGS

In the accompanying drawings:

FIGS. 4a-4c respectively illustrate orthographic front elevation, side elevation and top views of the first embodiment of the first aspect of the metal-casting mold;

FIG. 8 illustrates the loading of a metal ingot in the metal-casting mold prior to heating and casting, in accordance with the first and second aspects of the metal-casting process illustrated in FIGS. 1 and 17, respectively;

FIG. 9 illustrates the metal-casting mold with the metal ingot loaded in the ingot-cup portion thereof, prior to heating and casting, in accordance with the first and second aspects of the metal-casting process illustrated in FIGS. 1 and 17, respectively;

FIG. 10 illustrates the metal-casting mold after heating and casting, prior to removal of the mold portion from the associated cast component that was cast therein, in accordance with the first and second aspects of the metal-casting process illustrated in FIGS. 1 and 17, respectively;

FIGS. 14a-14c respectively illustrate orthographic front elevation, side elevation and top views of a second embodiment of the first aspect of a metal-casting mold incorporating a second aspect of an associated filler-and-riser topology;

FIG. 23 illustrates a modification of the second embodiment of the first aspect of the metal-casting mold illustrated in FIG. 16, but with the conduit above the component-mold portion closed at the top thereof; and FIG. 24 illustrates a modification of the first embodiment of the second aspect of the metal-casting mold formed by additive manufacturing illustrated in FIG. 18, but with the top of the associated riser portion closed.

DESCRIPTION OF EMBODIMENT(S)

Figure 1:
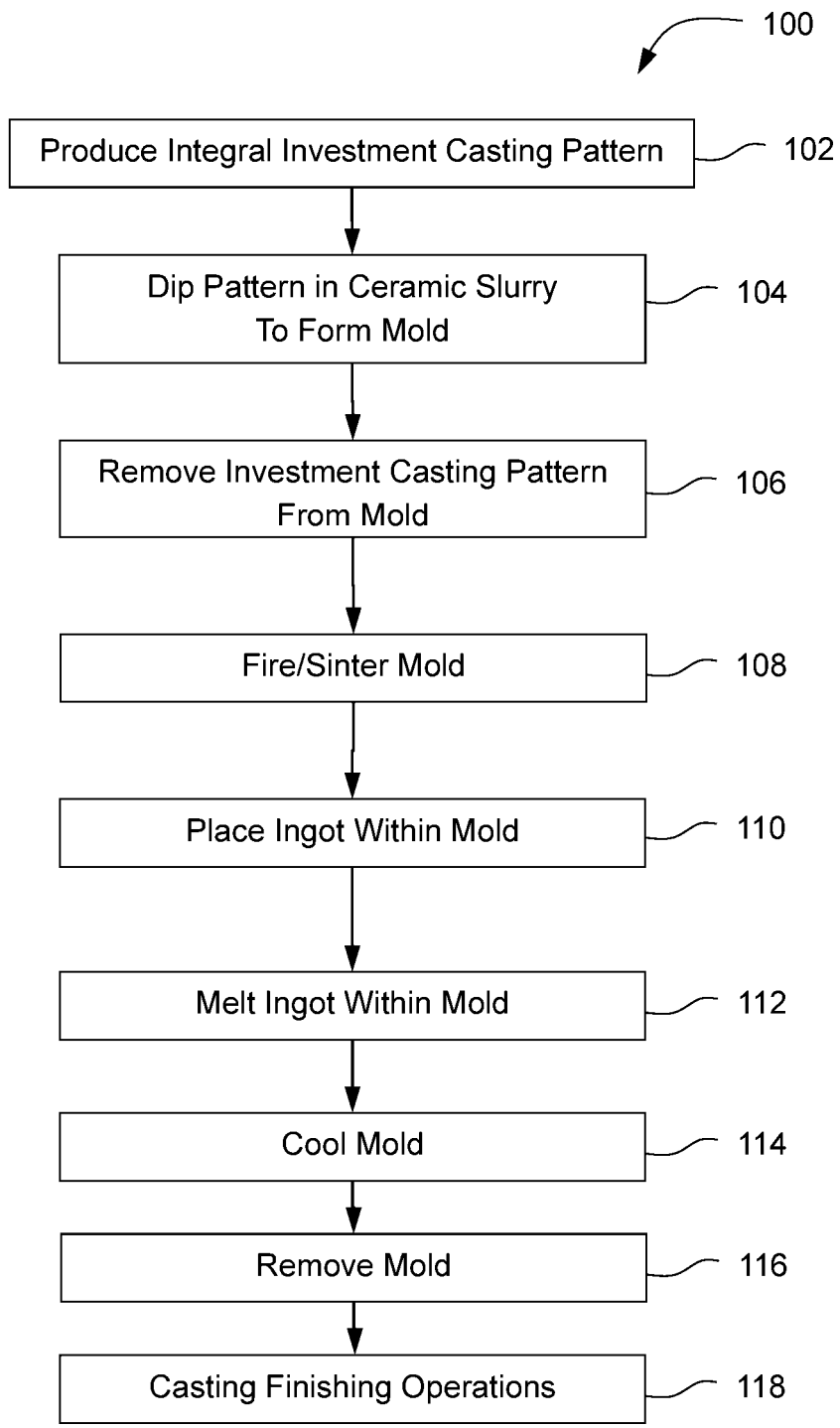
FIG. 1 illustrates a flow chart of a first aspect of a metal-casting process using a first aspect of a metal-casting mold, the latter formed as an investment-casting mold.
Figures 2A, 2B, 2C:
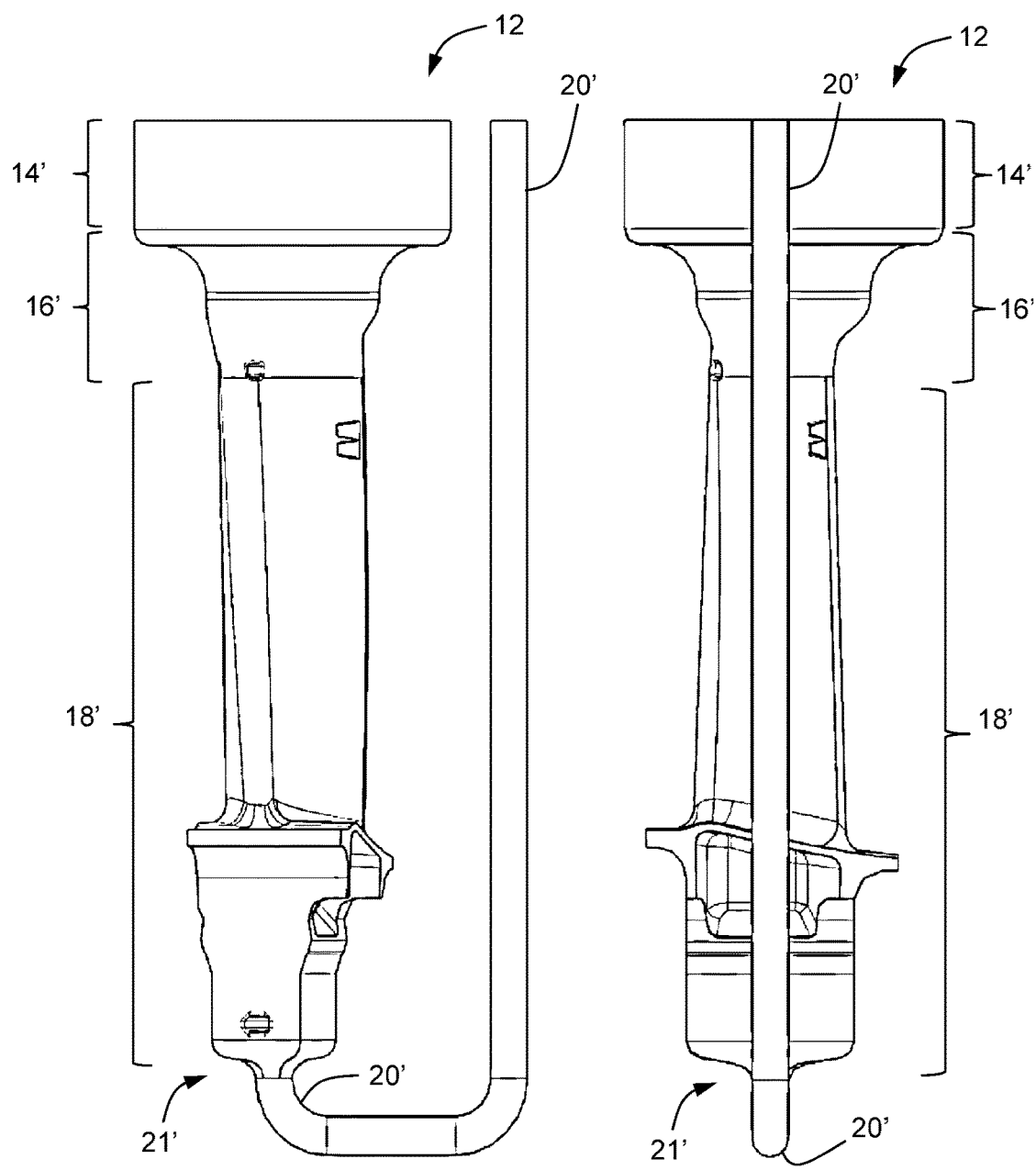
FIGS. 2a-2c respectively illustrate orthographic front elevation, side elevation and top views of a first embodiment of an investment-casting pattern used to form a first embodiment of the first aspect of a metal-casting mold incorporating a first aspect of an associated filler-and-riser topology, in accordance with the first aspect of the metal-casting process illustrated in FIG. 1.
Figure 3:
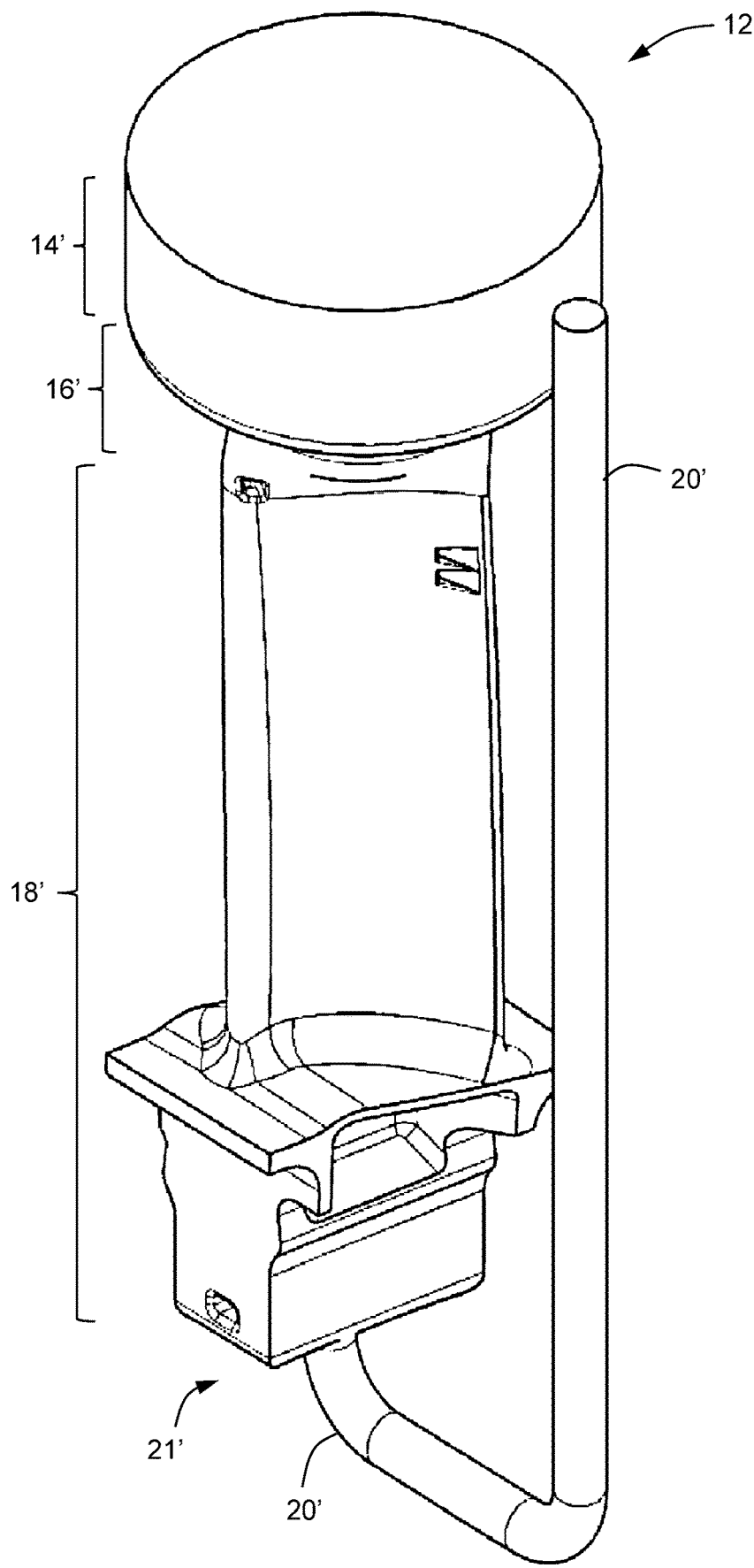
FIG. 3 illustrates an isometric view of the first embodiment of the investment-casting pattern illustrated in FIGS. 2a-2c.
Figure 6:
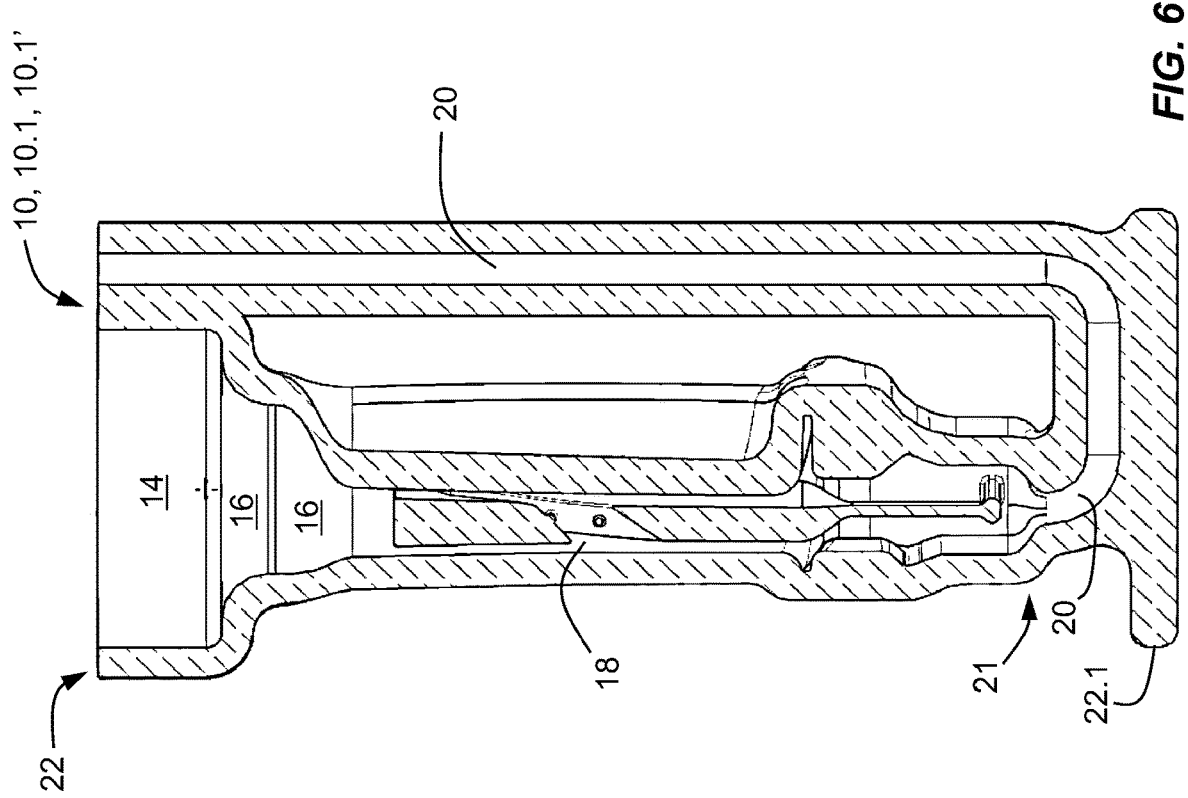
FIG. 6 illustrates a cross-sectional elevation view of the first embodiment of the first aspect of the metal-casting mold illustrated in FIGS. 4a-4c and 5.
Figure 5:
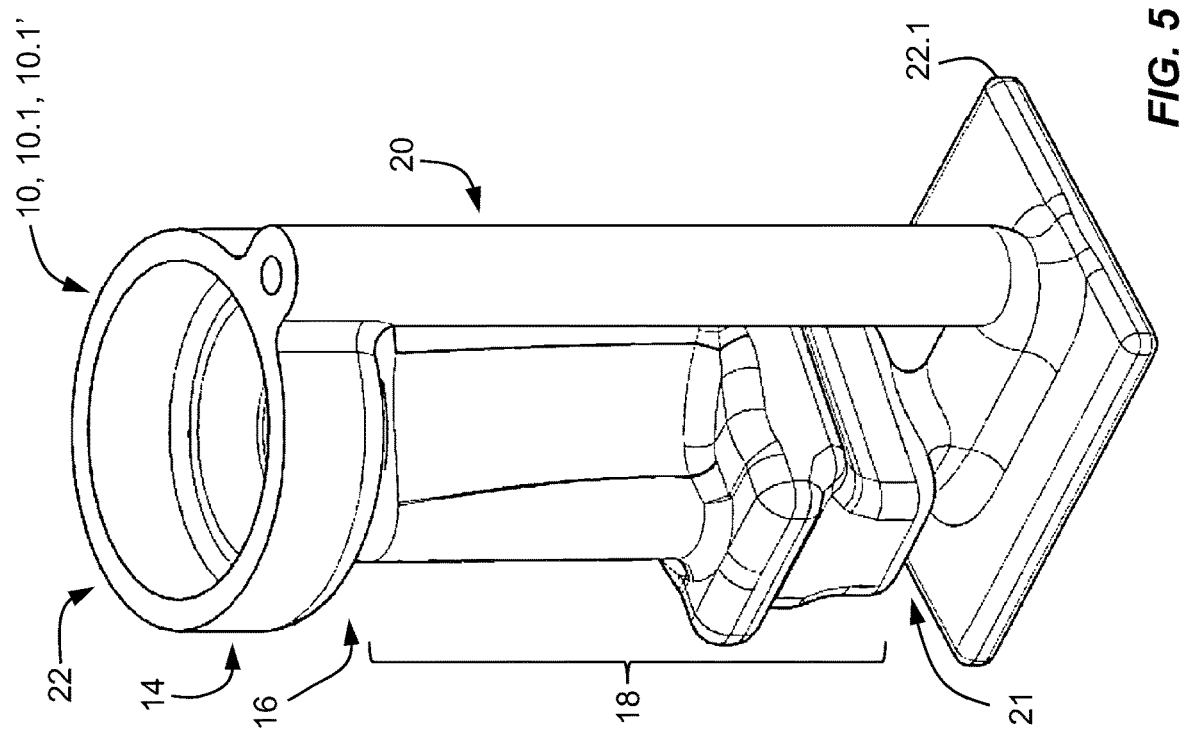
FIG. 5 illustrates an isometric view of the first embodiment of the first aspect of the metal-casting mold illustrated in FIGS. 4a-4c.

Referring to FIGS. 1 through 6, step (102) of a first aspect of a metal-casting process 100—also referred to as an investment casting process 100 or a "lost-wax" casting process—provides for forming a metal-casting mold 10 as an investment-casting mold 10, 10.1 from an integral investment-casting pattern 12. The metal-casting mold 10 comprises an ingot-cup portion 14 (formed from an associated ingot-cup-pattern portion 14'), a funnel portion 16 (formed from an associated funnel-pattern portion 16'), a component-mold portion 18 (formed from an associated component-mold-pattern portion 18'), and a riser portion 20 (formed from an associated riser-pattern portion 20'), wherein the riser portion 20 extends from the base 21 (associated with a base 21' of the component-mold-pattern portion 18') of the component-mold portion 18 to an elevation above the top of the component-mold portion 18, and the ingot-cup portion 14 is in direct fluid communication with the funnel portion 16, the latter of which provides for receiving molten metal from the former and directing this into the component-mold portion 18.

Referring to FIGS. 4a-c, 5 and 6, in accordance with a first embodiment of a first aspect, the metal-casting mold 10, 10.1' incorporates a first aspect of an associated filler-and-riser topology, wherein the funnel portion 16 is in direct fluid communication with the top of the component-mold portion 18 of the metal-casting mold 10, 10.1', so as to provide for filling the component-mold portion 18 from the top thereof, and the riser portion 20 is vented at an elevation above the top of the component-mold portion 18.

The integral investment-casting pattern 12 is constructed from a material, for example, wax, that can be removed from the investment-casting mold 10, 10.1 by either heating or chemical dissolution. The integral investment-casting pattern 12 may be formed by either casting, for example, of wax or a low-ash plastic; subtractive manufacture, for example, starting with a wax or low-ash plastic solid material; or additive manufacture, for example, by either a) lithography-type printing of a wax material, b) stereolithography, or "SLA", formation of the mold by photopolymerization of a resin, or c) formation of the mold from a powdered thermoplastic by Selective Laser Sintering (SLS), or some other laser additive process. For example, the integral investment-casting pattern 12 may be formed by stereolithography using a method and material as disclosed in U.S. Pat. No. 4,844,144, which is incorporated by reference in its entirety.

In step (104) of the investment casting process 100, the integral investment-casting pattern 12 is dipped in a ceramic slurry a plurality of times so as to build up a plurality of layers of an associated ceramic shell 22 thereabout, that—referring to FIGS. 4a-c, 5 and 6—becomes the investment-casting mold 10, 10.1 after the integral investment-casting pattern 12 is removed therefrom. For example, in one set of embodiments, the ceramic slurry comprises a mixture of about 77% by weight aluminum oxide mixed with about 14% by weight silicon oxide in addition to small amounts of water and binder. For some applications additional layers may be added of a mixture of about 77% by weight zirconium oxide mixed with about 19% by weight silicon oxide in addition to small amounts of water and binder. The total thickness of the shell is typically about 5/16 inches (8 mm) so as to form the desired shape, but not so thick as to overly restrain the molten metal as it solidifies and cools, so as to thereby prevent hot tears. The ceramic shell 22 also incorporates a ceramic base portion 22.1 so as to provide for a self-supporting, free-standing investment-casting mold 10, 10.1.

Figure 7:
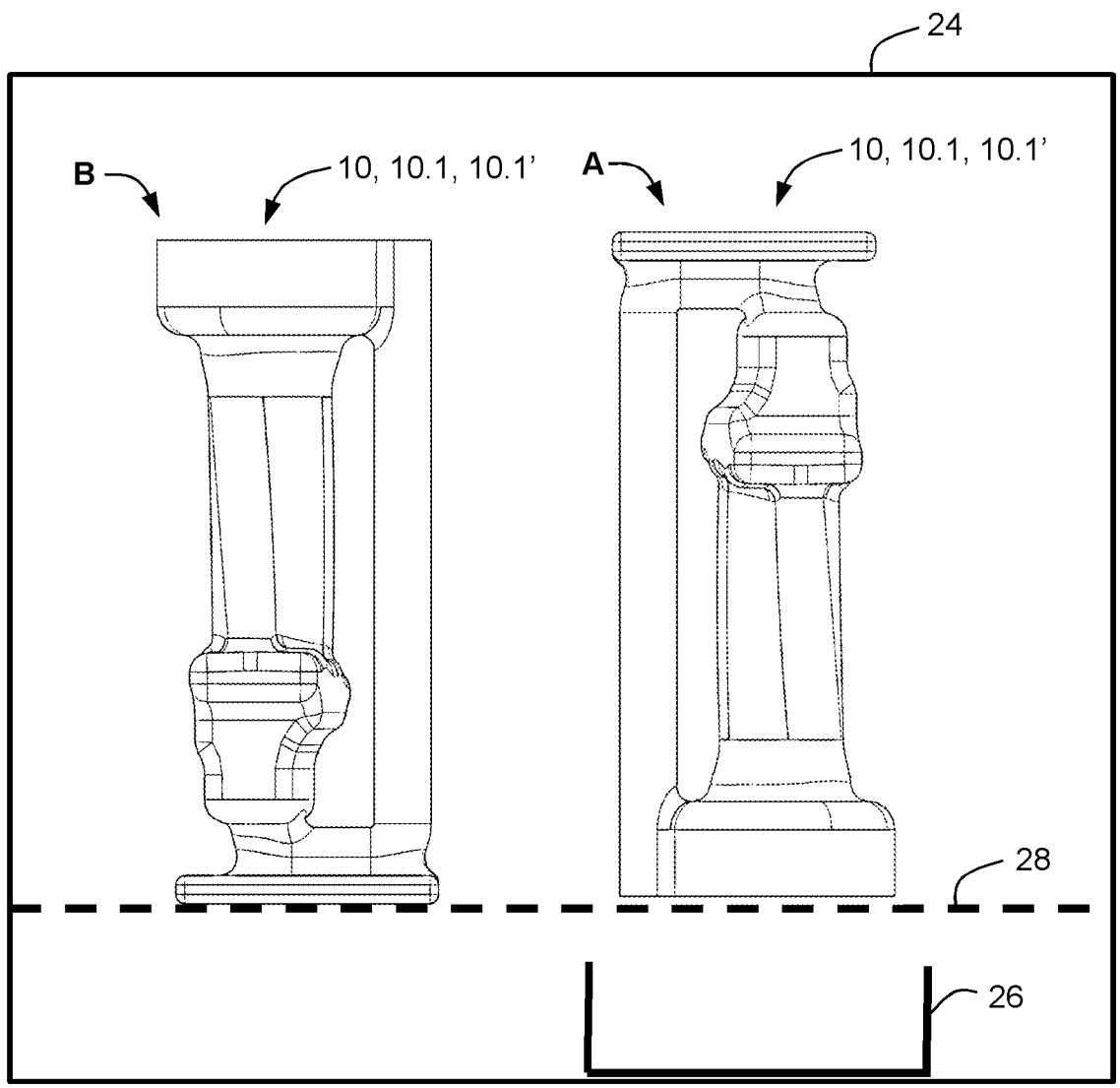
FIG. 7 illustrates a plurality of investment-casting molds within a furnace during associated processes to remove the associated investment casting pattern from the investment-casting mold and to sinter the investment-casting mold, in accordance with the first aspect of the metal-casting process illustrated in FIG. 1.

Referring to FIG. 7, in step (106) of the investment casting process 100, the integral investment-casting pattern 12 is removed from the investment-casting mold 10, 10.1 by either heating the ceramic-slurry-covered integral investment-casting pattern 12 in a furnace 24, which melts or burns the material of the integral investment-casting pattern 12; or by chemical dissolution of the integral investment-casting pattern 12 by either immersion of the ceramic-slurry-covered integral investment-casting pattern 12 in a solvent tank or exposure of the integral investment-casting pattern 12 therein to a stream of solvent. Then, following or during removal of the integral investment-casting pattern 12 from the investment-casting mold 10, 10.1 in step (106), in step (108), the investment-casting mold 10, 10.1 is fired in a furnace 24 in order to sinter the associated ceramic shell 22. For example, in FIG. 7, a first investment-casting mold 10, 10.1 designated by "A" is illustrated upside down above a receptacle 26 for catching the molten integral investment-casting pattern 12 draining from the investment-casting mold 10, 10.1 during step (106), and a second investment-casting mold 10, 10.1 designated by "B" is illustrated upright during step (108), wherein both the first and second investment-casting mold 10, 10.1 are supported on a rack 28 within the furnace 24. For example, in one set of embodiments, the investment-casting mold 10, 10.1 is fired so as to elevate the temperature thereof to approximately 1,800 to 1,900 degrees Fahrenheit, wherein the particular bounds of the associated temperature range will generally depend upon the material from which the investment-casting mold 10, 10.1 is made, but is generally sufficient, and for a sufficient period of time, to burn out the binder and residual solvent of the material used to form the investment-casting mold 10, 10.1, and may be sufficient to provide for at least partially sintering the associated ceramic material. It should be understood that the processes of burning out or removing the integral investment-casting pattern 12 and sintering the investment-casting mold 10, 10.1 may be performed either together in one combined operation, or as separate and distinct operations.

Referring to FIGS. 8 and 9, in step (110) of the investment casting process 100, a metal ingot 30 of metal (wherein the term "metal" as used herein is also intended to refer to metal alloys) to be cast is loaded into the ingot-cup portion 14 of the investment-casting mold 10, 10.1. In one embodiment, the metal ingot 30 is sufficiently pure so as to not necessitate subsequent filtering to remove impurities from the resulting molten metal 30' after melting. The metal ingot 30 may either be in the form of a single solid disk or block—as illustrated—or in the form of a plurality of solid disks or blocks, each associated with a different associated ingot-cup portion 14 operatively coupled to a common component-mold portion 18 via a corresponding different associated funnel portion 16, wherein the different ingot-cup portions 14 could have similar or different corresponding radiation view factors with respect to the below-described susceptor 32 or induction heating coil 36 so as to provide for controlling the rate at which the molten metal 30' is produced and fed into the component-mold portion 18. A plurality of metal ingots 30 could also be used with a plurality of corresponding ingot-cup portions 14 when feeding a component-mold portion 18 having a relatively large transverse extent. The use of an integral metal ingot 30 in each ingot-cup portion 14 provides for minimizing the ratio of surface area to volume of the metal ingot 30—for example, relative to a metal ingot 30 comprising a plurality of distinct pieces within a single ingot-cup portion 14—which in turn provides for minimizing the inclusion of oxides that could develop on the surface of metal ingot 30.

Figure 11:
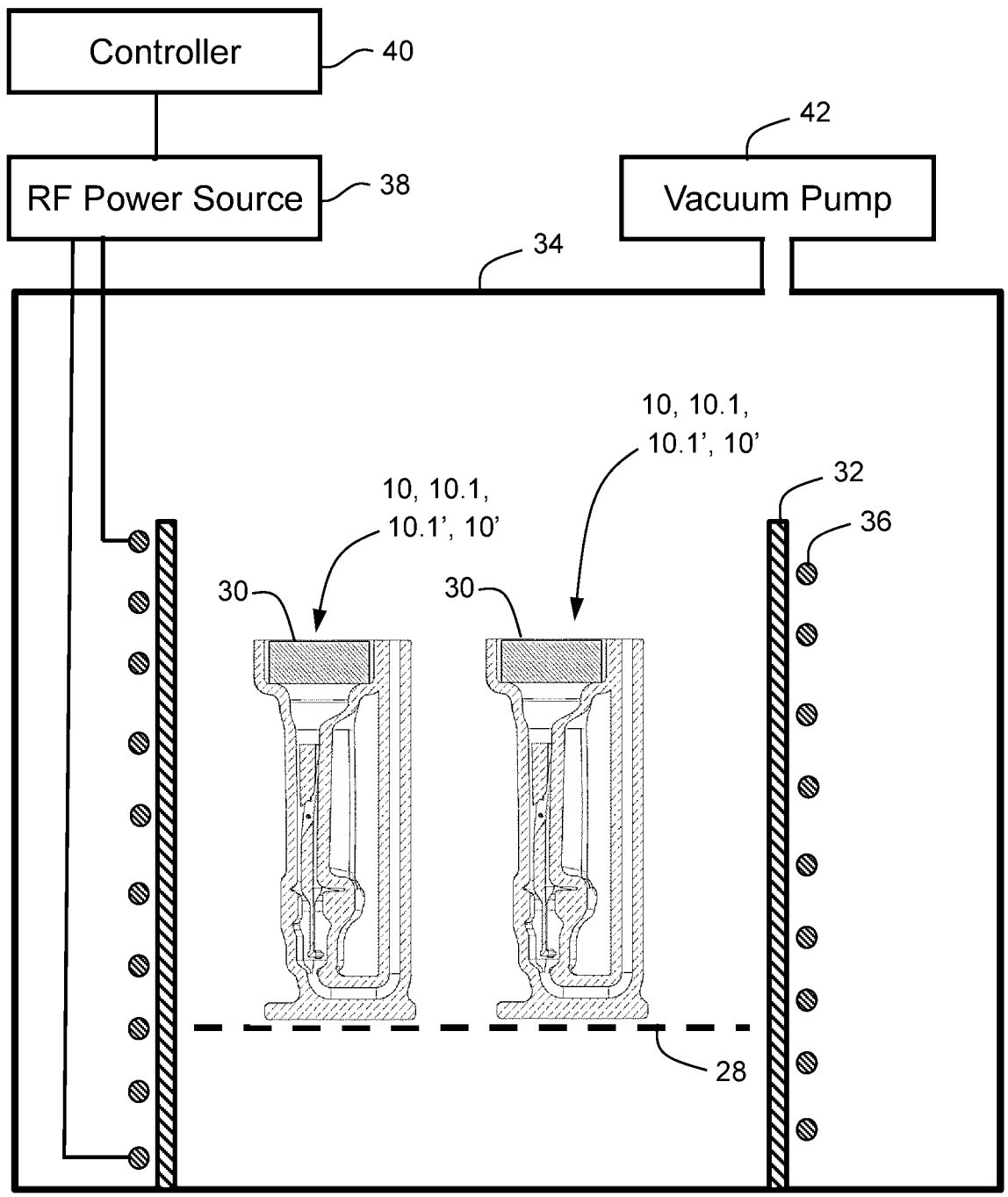
FIG. 11 illustrates a vacuum induction furnace used to heat the metal-casting mold in order to melt the metal ingot therein and cast the associated component within the metal-casting mold with the molten metal from the metal ingot.

Referring to FIGS. 10, and 11, in step (112) of the investment casting process 100, and in accordance with one set of embodiments, the loaded metal-casting mold 10' is then placed within a hollow cylindrical susceptor 32—which, for example, in one embodiment, is constructed of a single piece of graphite of about 15 inches (381 mm) in inside diameter.—in vacuum induction furnace 34, wherein the susceptor 32 is surrounded by an induction heating coil 36 of the vacuum induction furnace 34 so as to provide for shielding the loaded metal-casting mold 10' from being directly electromagnetically heated by the induction heating coil 36, the latter of which is powered by an associated RF power source 38 under control of an associated controller 40. The susceptor 32 provides for absorbing RF electromagnetic energy from the induction heating coils 36 and converting this to heat, which is then radiantly emitted therefrom so as to provide for heating the one or more loaded metal-casting molds 10' contained therewithin. With the vacuum induction furnace 34 evacuated by an associated vacuum pump 42 to achieve a vacuum of 0.1 to 20 millitorr, the loaded metal-casting mold 10' is radiantly heated by the electromagnetically-heated susceptor 32, the latter of which is heated to a temperature so as to provide for the metal ingot 30 to be heated to a temperature that is, for example, in one embodiment, eventually approximately 50 degrees Fahrenheit (28 degrees Celsius) higher than the upper bound of the nominal melting range of the associated alloy constituting the metal ingot 30. The temperature to which the metal ingot 30 is heated is not limiting, although higher temperatures may incur a greater risk of resulting associated casting defects. In one set of embodiments, the vacuum is not in excess of 1 millitorr when melting the metal ingot 30.

Alternatively, the metal ingot 30 could be heated directly via induction heating by the induction heating coil 36, with or without the use of a susceptor 32, for example, either separate from, or in combination with, the susceptor 32. For example, in one set of embodiments, a separate one or more induction heating coils may be used to heat one or more portions of the metal-casting mold 10, 10', 10.1, 10.1', 10.1", 10.2, 10.2', 10.2", for example, the ingot cup portion 14, alone or in addition to other portions, either alone, or in combination with the susceptor 32—powered by the induction heating coil 36—used to heat one or more remaining portions of the metal-casting mold 10, 10', 10.1, 10.1', 10.1", 10.2, 10.2', 10.2". Alternatively, in another set of embodiments, one or more of the separate one or more induction heating coils may be used in combination with—for example, within—the susceptor 32.

More particularly, the electromagnetically-heated susceptor 32 initially gradually heats the metal-casting mold 10 to a specified temperature slightly below melting range of metal ingot 30—for example, in one set of embodiments, about 20 to 100 degrees Fahrenheit (11 to 56 degrees Celsius), or more particularly, for example, about 20 degrees Fahrenheit (11 degrees Celsius)—below the lower bound of the melting range of the associated metal or alloy—for a first dwell period sufficient to provide for achieving a substantially uniform temperature within and throughout the interiors of the metal-casting mold 10 and the metal ingot 30, wherein the duration of the first dwell period will depend upon the volumes of the metal-casting mold 10 and the metal ingot 30. Then, following the first dwell period, the susceptor 32 is further heated so as to provide for slowly increasing the temperature of the metal-casting mold 10 and the metal ingot 30 to a specified temperature—for example, in one set of embodiments, about 20 to 100 degrees Fahrenheit (11 to 56 degrees Celsius), or more particularly, for example, about 100 degrees Fahrenheit (56 degrees Celsius)—above the melting range of metal ingot 30, at which point the temperature is maintained for a second dwell period that is sufficient to provide for filling the component-mold portion 18, wherein the duration of the second dwell period will depend upon the volume of the metal ingot 30 and the flow rate of the molten metal 30' into the component-mold portion 18.

Accordingly, the radiant heating by the susceptor 32 provides for heating the investment-casting mold 10, 10.1 to a temperature above the melting point of the metal ingot 30, after which the heated investment-casting mold 10, 10.1 in turn provides for heating the metal ingot 30 so as to provide for melting the metal ingot 30, the molten metal 30' from which then flows into the component-mold portion 18 of the investment-casting mold 10, 10.1 via the associated funnel portion 16 thereof. As the component-mold portion 18 fills with molten metal 30' from the metal ingot 30, the molten metal 30' also flows into the riser portion 20, the latter of which provides for venting gases that might be dissolved in the molten metal 30' from the metal ingot 30, wherein the level of molten metal 30' within the riser portion 20 tends towards hydrostatic equilibrium with respect to the level of molten metal 30' within the component-mold portion 18 of the investment-casting mold 10, 10.1. In one set of embodiments, the vacuum induction furnace 34 and susceptor 32 are sufficiently large so as to simultaneously accommodate a plurality of loaded investment-casting molds 10.1' therewithin during a single casting operation.

With the metal ingot 30 initially placed in solid form in the ingot-cup portion 14 of the metal-casting mold 10, and then subsequently melted therein, the flow rate and resulting momentum of the resulting molten metal 30' within the metal-casting mold 10 is relatively low in comparison with what would result if the molten metal 30' were poured from a crucible, so as to provide for reducing the velocity and turbulence of the molten metal 30' across the detailed features within the component-mold portion 18, which in turn provides for improving the quality of the resulting casting, particularly if the latter incorporates relatively fine features. A relatively turbulent, high-momentum flow of molten metal 30' could otherwise damage a fragile shell of the metal-casting mold 10, or otherwise cause an associated core of the casting to shift, either of which would not meet the intent of the design, and may result in scrap.

The melt rate of the metal ingot 30 can be controlled or further limited by controlling the heat flux from the susceptor 32, so as to provide for controlling the rate of flow of molten metal 30' into the component-mold portion 18 over time. For example, the melt to rate could be scheduled in correspondence with the expected level of molten metal 30' within the component-mold portion 18 and the level-dependent nature of the associated features thereof. The scheduling of heat flux to control melt rate would be expected to be most effective for metal ingots 30 of relatively pure composition having a discrete meting point, but would be generally applicable to other metal compositions as well.

Returning to FIG. 1, following step (112), after the molten metal 30' has reached hydrostatic equilibrium within the loaded metal-casting mold 10', following the above-described second dwell period, the loaded metal-casting mold 10' is then cooled in step (114) of the investment casting process 100, resulting in a metal casting 44 within the investment-casting mold 10, 10.1. The rate at which the loaded metal-casting mold 10' is cooled will depend upon the desired crystal grain size, mechanical properties, and other attributes of the resulting metal casting 44. For example, the loaded metal-casting mold 10' could either be radiatively cooled under vacuum, e.g. in the vacuum induction furnace 34, under ambient conditions in air or a gas, or under forced air or gas cooling.

Figure 13:
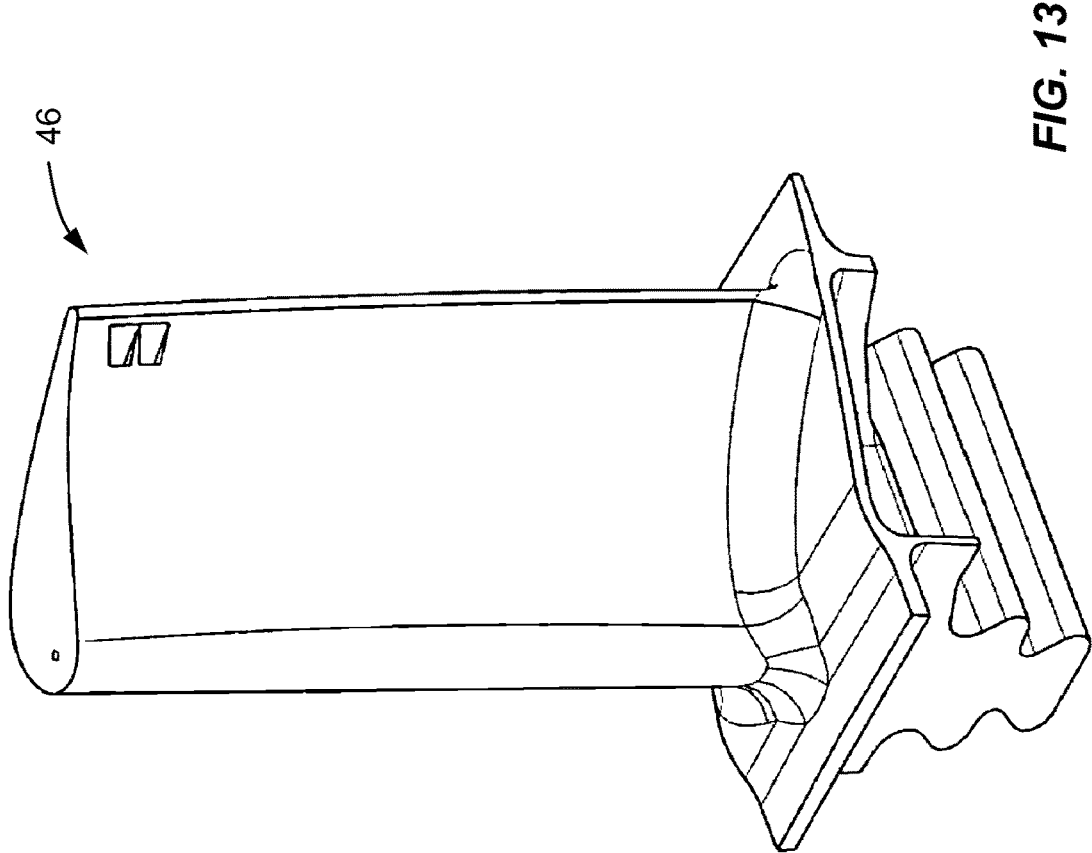
FIG. 13 illustrates an isometric view of a finished cast component after subsequent casting finishing operations on the metal casting illustrated in FIG. 12, in accordance with the first and second aspects of the metal-casting process illustrated in FIGS. 1 and 17, respectively.
Figure 12:
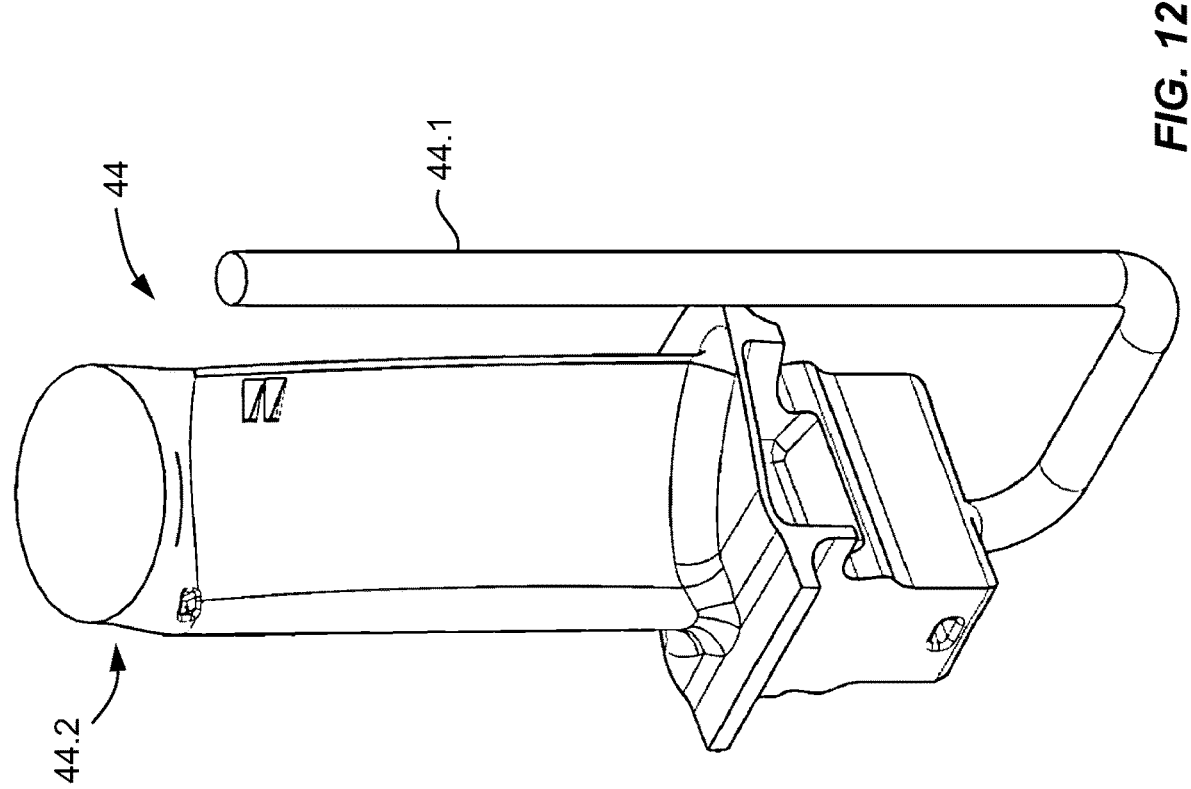
FIG. 12 illustrates an isometric view of a metal casting following removal of the metal-casting mold therefrom, in accordance with the first and second aspects of the metal-casting process illustrated in FIGS. 1 and 17, respectively.
Figure 16:
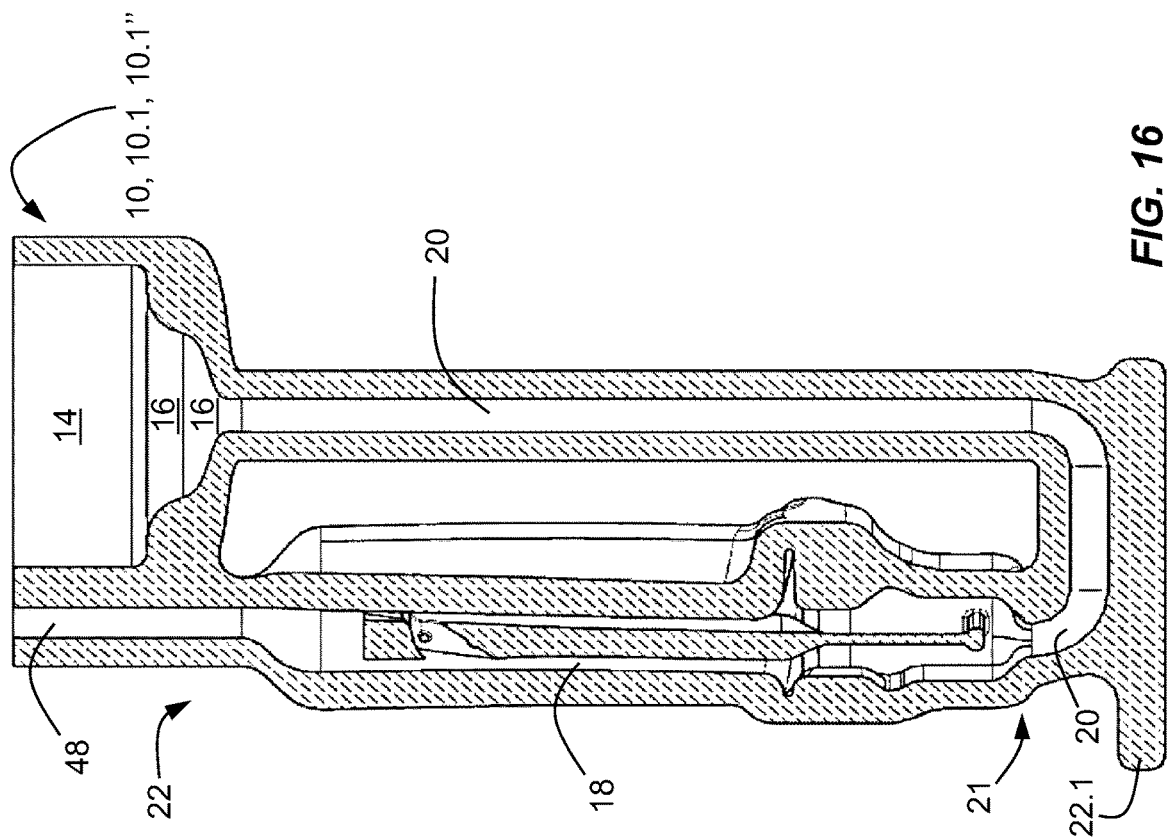
FIG. 16 illustrates a cross-sectional elevation view of the second embodiment of the first aspect of the metal-casting mold illustrated in FIGS. 14a-14c and 15.
Figure 15:
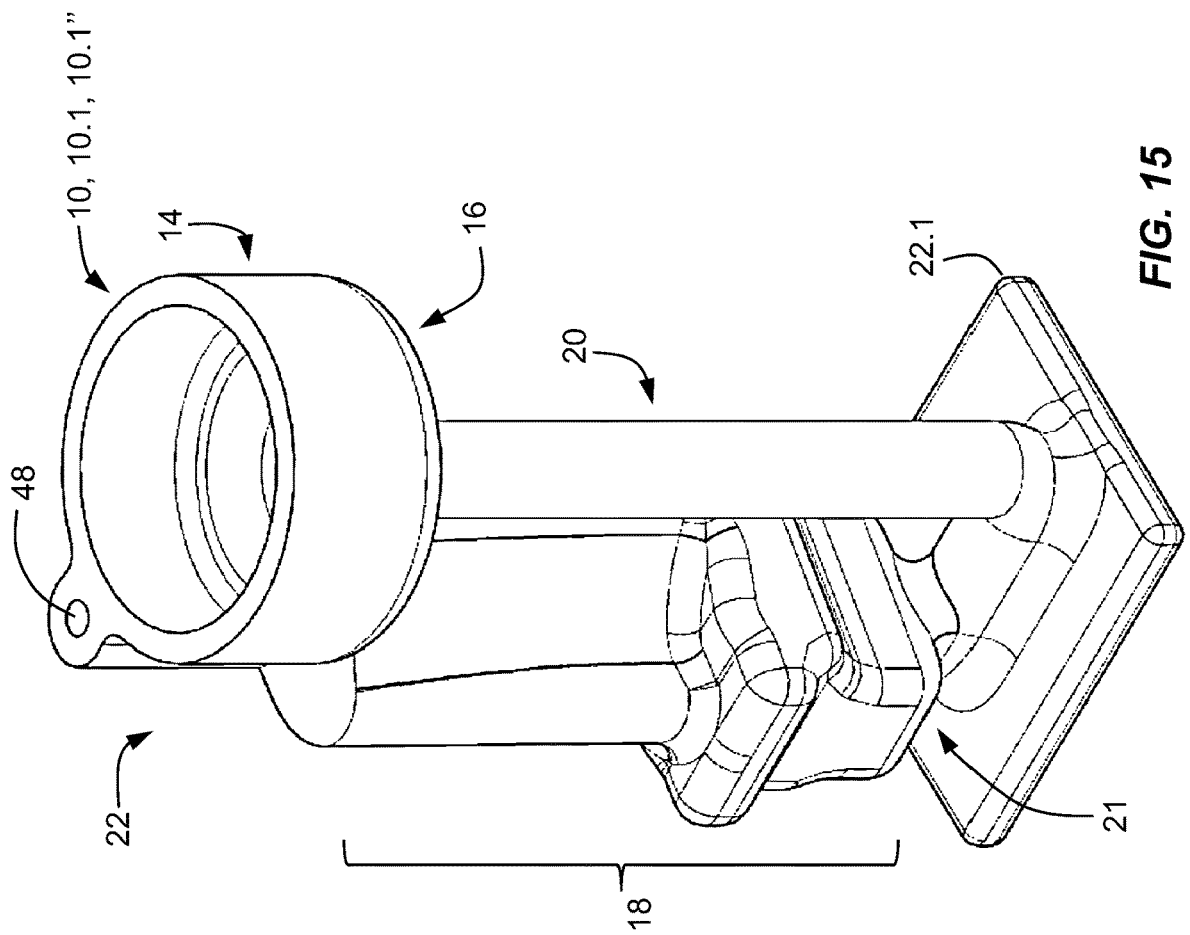
FIG. 15 illustrates an isometric view of the second embodiment of the first aspect of the metal-casting mold illustrated in FIGS. 14a-14c.

Then, referring also to FIG. 12, in step (116) of the investment casting process 100, the ceramic investment-casting mold 10, 10.1 is removed from around the metal casting 44—for example, either by simple mechanical breakage or by chemical dissolution (i.e. leaching), the latter of which would be appropriate if the metal-casting mold 10 incorporates cast internal features, such as the core of a cooled turbine blade. Then, referring also to FIG. 13, in step (118), the riser portion 44.1 and any remaining funnel portion 44.2 of the metal casting 34 are removed by an associated finishing operation (118), resulting in the completion of the finished component 46. In one set of embodiments, the cross-sectional area of the riser portion 20 of the investment-casting mold 10, 10.1, and the amount of metal in the metal ingot 30, are selected so as to provide for minimizing the amount of metal from the metal ingot 30 that needs to be removed during the finishing operation (118).

Referring to FIGS. 14*a-c*, 15, and 16, in accordance with a second embodiment of a first aspect, the metal-casting mold 10, 10.1" incorporates a second aspect of an associated filler-and-riser topology, wherein the funnel portion 16 is in direct fluid communication with the top of the riser portion 20 of the metal-casting mold 10, so as to provide for filling the component-mold portion 18 via the riser portion 20, and the top of the component-mold portion 18 is extended thereabove via an associated conduit 48 of the metal-casting mold 10, 10.1", which may be either vented or closed at a location above the top of the component-mold portion 18. For example, FIG. 23 illustrates a modified version of the second embodiment of the first aspect illustrated in FIG. 16, for which the conduit 48 above the competent-mold portion 18 is closed at the top thereof. Accordingly, during casting, the component-mold portion 18 is filled from the bottom up, which provides for reducing the velocity and turbulence of the molten metal 30' across the detailed features within the component-mold portion 18, so as to provide for improving the quality of the resulting casting, particularly if the latter incorporates relatively fine features. In one set of embodiments, the ratio of surface area to volume of the conduit 48—whether vented or closed—is sufficiently lower than that of a proximal portion of the component-mold portion 18 so as to provide for the molten metal 30' in the conduit 48 to solidify more slowly than the molten metal 30' in the component-mold portion 18, and the volume of the conduit 48 is sufficient, so as to provide for mitigating against shrinkage of the proximal portion of the associated metal casting 44.

Furthermore, the velocity of the molten metal 30' entering the component-mold portion 18 of the metal-casting mold 10, 10.1" can be further reduced by reducing the inside diameter of the riser portion 20 of the metal-casting mold 10, 10.1" through which the molten metal 30' must pass, which further provides for further reducing the velocity and turbulence of the molten metal 30' flowing into and through the component-mold portion 18 of the metal-casting mold 10, 10.1". For example, the riser portion 20 may be made of standard spaghetti wax having a diameter between 0.125 and 0.25 inches (3 to 7 mm), but possibly larger for relatively larger castings. In one set of embodiments—for either the first or second aspects of the associated filler-and-riser topology,—the cross-sectional area of at least a portion of the riser portion 20 is not in excess of half the minimum cross-sectional area of the flow path between the ingot-cup portion 14 and the component-mold portion 18, of the flow path to which a particular riser portion 20 is most proximally or directly associated if there are plural riser portions 20. As with the first aspect of the associated filler-and-riser topology, the second aspect of the associated filler-and-riser topology could also incorporate a plurality of separated ingot cup 14 and funnel 16 portions, each of which is associated with a corresponding separate riser portion 20 of a plurality of riser portions 20, particularly relatively large castings, particularly castings having a relatively large lateral extent. Except for the differences associated with the filler-and-riser topology, the second embodiment of the first aspect of the metal-casting mold 10, 10.1" is constructed and used substantially the same as the above-described first embodiment, in accordance with the above-described investment casting process 100.

Figure 17:
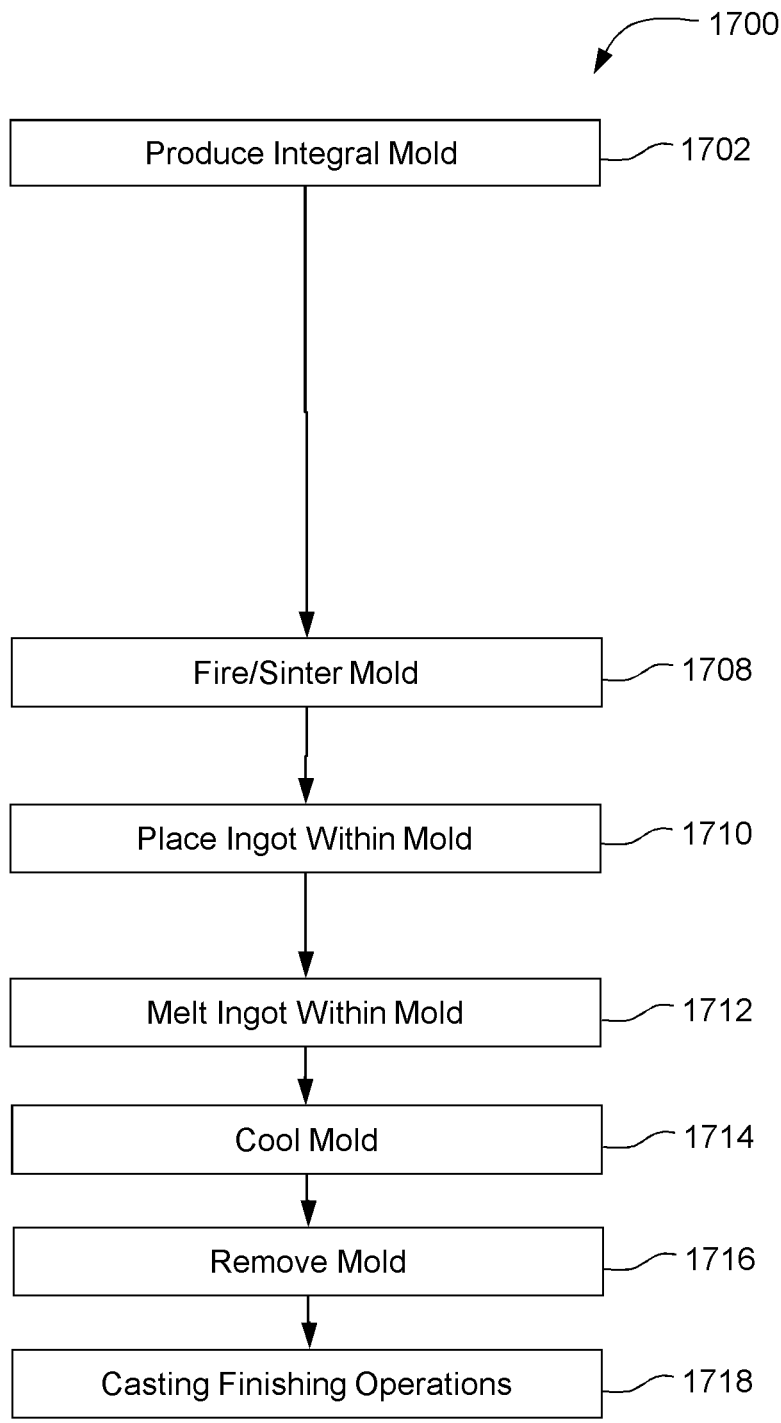
FIG. 17 illustrates a flow chart of a second aspect of a metal-casting process using a second aspect of a metal-casting mold, the latter formed by additive manufacturing.

Referring to FIG. 17, a second aspect of a metal-casting process 1700 is similar to the first aspect 100 illustrated in FIG. 1, except that in step (1702), the associated ceramic shell 22 of the metal-casting mold 10, 10.2 is formed, in accordance with a second aspect, by additive manufacturing, for example, as described in U.S. Pat. No. 6,932,145 B2, column 8, line 26 through column 11, line 30 (except that on Col. 8, line 35, "U.S. Pat. No. 5,340,650" should instead read—U.S. Pat. No. 5,340,656—), using a mold structure and materials described on column 11, line 61 through column 14, line 62, each of which hereinabove cited portions of U.S. Pat. No. 6,932,145 B2 is incorporated by reference herein in its entirety as corrected hereinabove. Alternatively, the second aspect of the metal-casting mold 10, 10.2 made in accordance with customer-provided specifications for the geometry thereof may be obtained from DDM SYSTEMS, INC. of Atlanta, Ga., which uses a material comprising a proprietary photo-sensitive monomer mixed with colloidal suspension of ceramic to additively manufacture the metal-casting mold 10, 10.2, for example, as described in U.S. Pat. Nos. 8,636,496 B2 and 9,403,322 B2, each of which are incorporated herein by reference in their entireties.

For example, in accordance with a first additive printing process, an integral metal-casting mold 10, 10.2 is formed by a three-dimensional printing of a ceramic material incorporating a binder, which is deposited in thin layers to directly form the associate metal-casting mold 10, 10.2. In accordance with a second additive printing process, a position-controlled laser beam is used to locally polymerize a ceramic material incorporating a photo-sensitive monomer along cross-sectional regions of the metal-casting mold 10, 10.2, for each of a plurality of layers, within a pool or supply of the ceramic material feedstock, after which the un-polymerized feedstock is removed, leaving the raw metal-casting mold 10, 10.2.

Regardless of the manner in which the metal-casting mold 10, 10.2 is additively formed, the metal-casting mold 10, 10.2 is then sintered in step (1708) of the metal-casting process 1700, for example, in accordance with a process described in U.S. Pat. No. 6,932,145 B2 on column 16, line 9 through column 17, line 25, which cited portion is incorporated by reference herein in its entirety.

Thereafter, steps (1710) through (1718) of the second aspect of the metal-casting process 1700 are the same as corresponding above-described steps (110) through (118) of the first aspect of a metal-casting process 100, respectively.

Figure 19A:
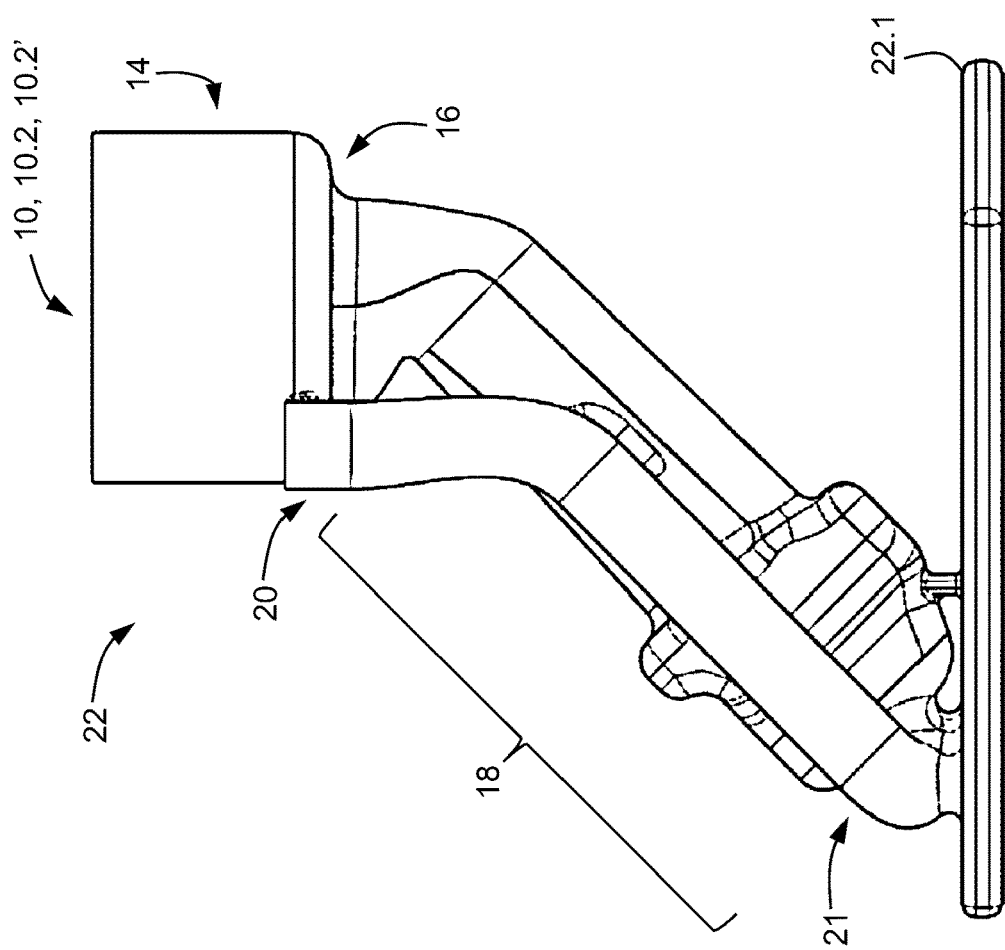
FIGS. 19a and 19b respectively illustrate orthographic front elevation and top views of the first embodiment of the second aspect of the metal-casting mold illustrated in FIG. 18.
Figure 18:
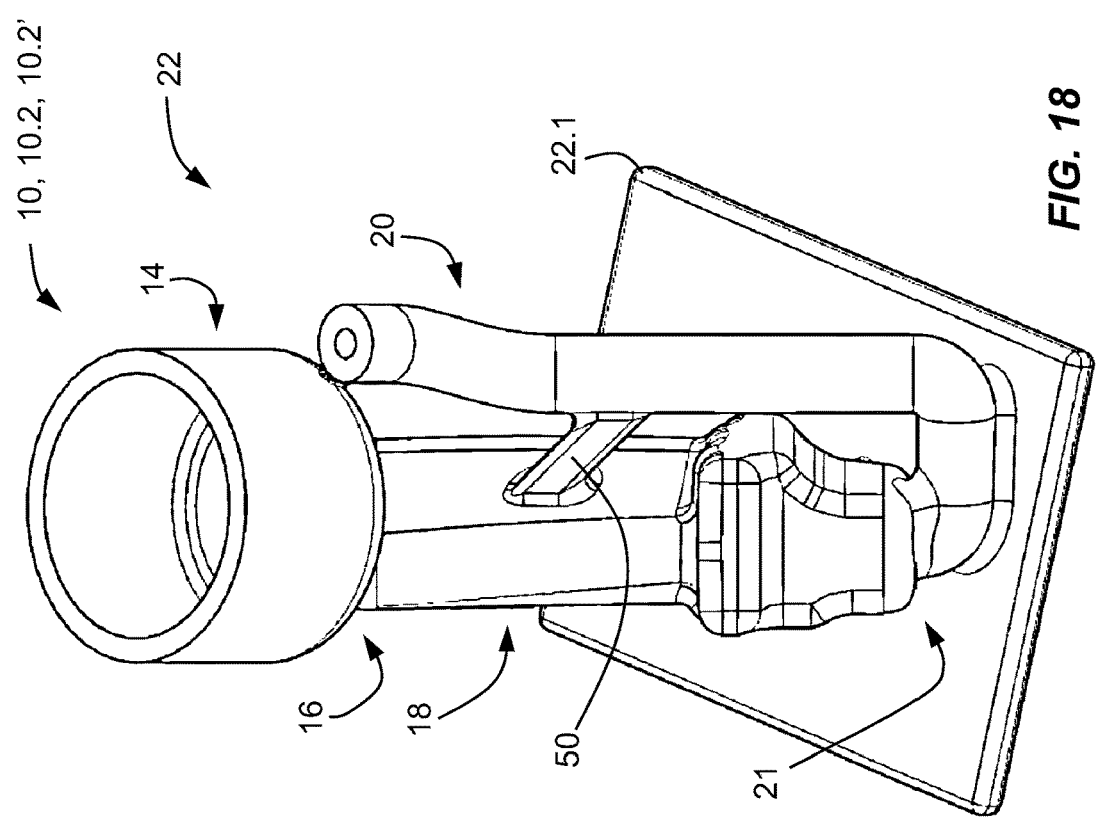
FIG. 18 illustrates an isometric view of a first embodiment of the second aspect of a metal-casting mold formed by additive manufacturing, incorporating the first aspect of the associated filler-and-riser topology, in according with the second aspect of the metal-casting process illustrated in FIG. 17.
Figure 19B:
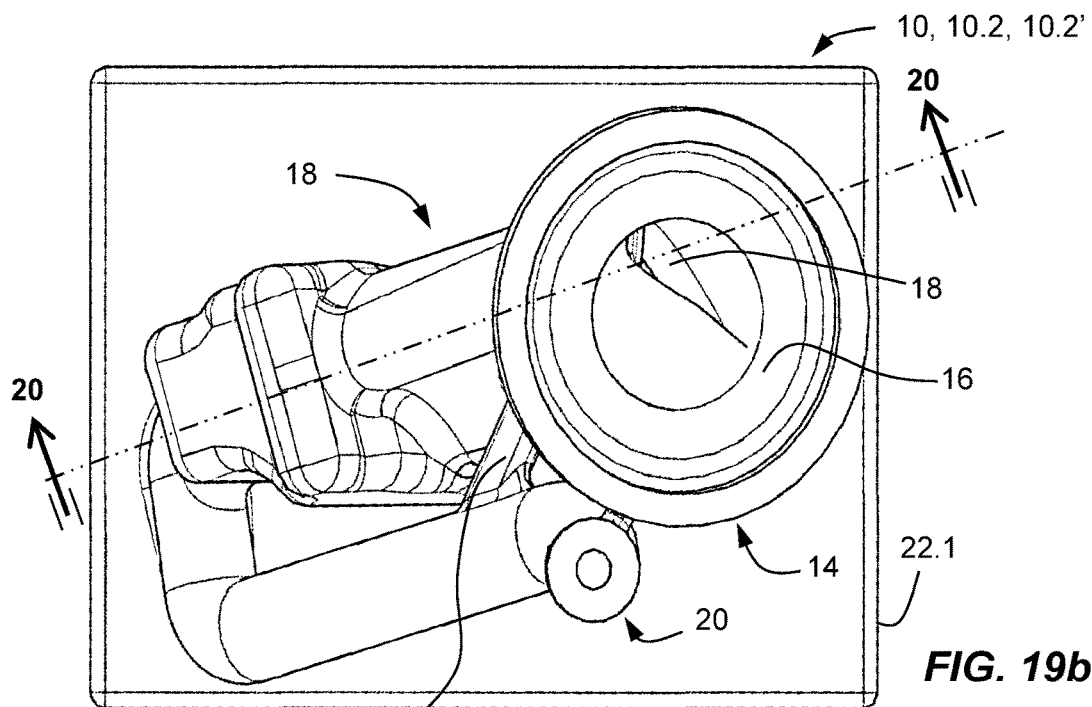
Figure 20:
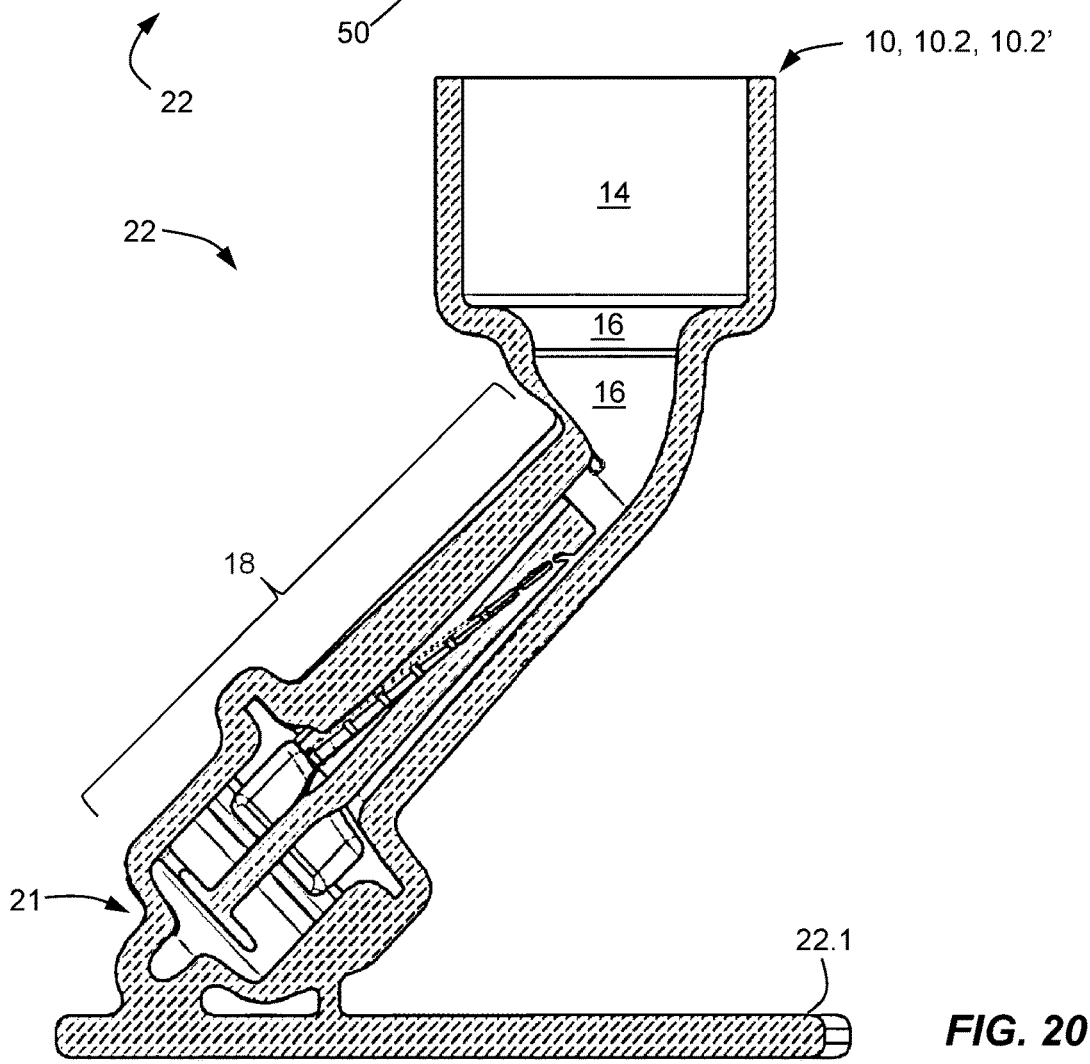
FIG. 20 illustrates a cross-sectional elevation view of the first embodiment of the second aspect of the metal-casting mold illustrated in FIGS. 18, 19a and 19b.

For example, referring to FIGS. 18-20, in accordance with a first embodiment of the second aspect, the additively-formed metal-casting mold 10, 10.2' incorporates the first aspect of an associated filler-and-riser topology, wherein the funnel portion 16 is in direct fluid communication with the top of the component-mold portion 18 of the metal-casting mold 10, 10.2', so as to provide for filling the component-mold portion 18 from the top thereof, and the riser portion 20 is either vented at an elevation above the top of the component-mold portion 18, or closed at a location above the base 21 of the component-mold portion 18, for example, as illustrated in FIG. 24. For example, in one set of embodiments, the ratio of surface area to volume of the riser portion 20—whether vented or closed—is sufficiently lower than that of a proximal portion of the component-mold portion 18 so as to provide for the molten metal 30' in the riser portion 20 to solidify more slowly than the molten metal 30' in the component-mold portion 18, and the volume of the riser portion 20 is sufficient, so as to provide for mitigating against shrinkage of the proximal portion of the associated metal casting 44. The component-mold portion 18 of the metal-casting mold 10, 10.2' is inclined so as to provide for forming some of the internal features thereof using additive manufacturing without requiring associated supports. For example, the inclination angle may range from 90 degrees from horizontal (i.e. fully vertical) to 35 degrees or less, depending upon the specific design of the component being cast, and particularly upon the nature of the associated geometric features thereof; and depending upon the nature of the associated additive manufacturing process. For example, the inclination angle could be as great as 90 degrees if there were no geometric features requiring build supports. As another example, an inclination angle of 45 degrees or less is selected as given by the maximum unsupported build angle of the particular additive machine being used, depending upon the type of additive manufacturing process. The inclined component-mold portion 18 also provides for being filled with molten metal 30' at a relatively lower velocity, i.e. relatively more gently than if vertical, during step (1712) of the associated metal-casting process 1700. It should be understood that the first aspect of the metal-casting mold 10, 10.1 could also incorporate an inclined component-mold portion 18 so as to provide for reducing the flow rate of molten metal 30' thereinto during step (112) of the associated metal-casting process 100. The additive manufacturing process provides for forming ceramic ribs 50 between portions of the metal-casting mold 10, 10.2' so as to provide for a self-supporting structure.

In one set of embodiments, the inclination of the component-mold portion 18 during manufacture is substantially the same as when the metal-casting mold 10, 10.2' is ultimately used for casting. Alternatively, the inclination from horizontal of the component-mold portion 18 during manufacture of the metal-casting mold 10, 10.2' could be different than the corresponding inclination when the metal-casting mold 10, 10.2' is ultimately used for casting.

Figure 21:
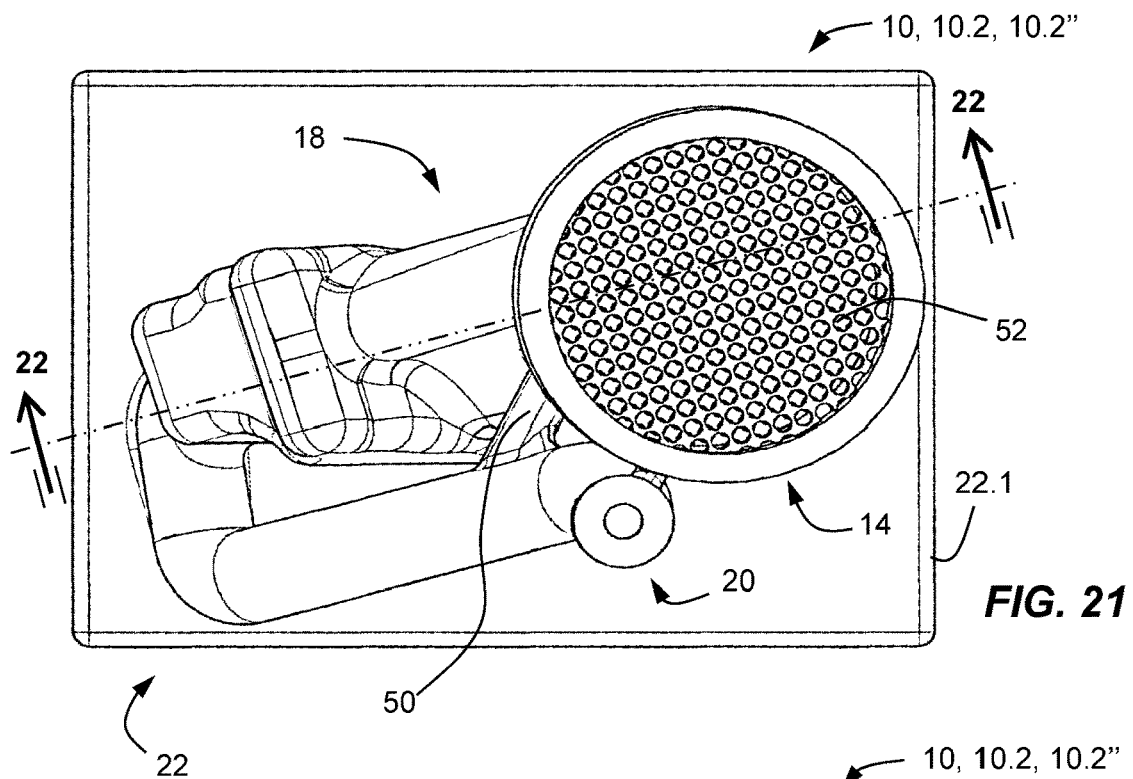
FIG. 21 illustrates an orthographic top view of a second embodiment of the second aspect of a metal-casting mold, incorporating a molten-metal filter and incorporating the first aspect of the associated filler-and-riser topology.
Figure 22:
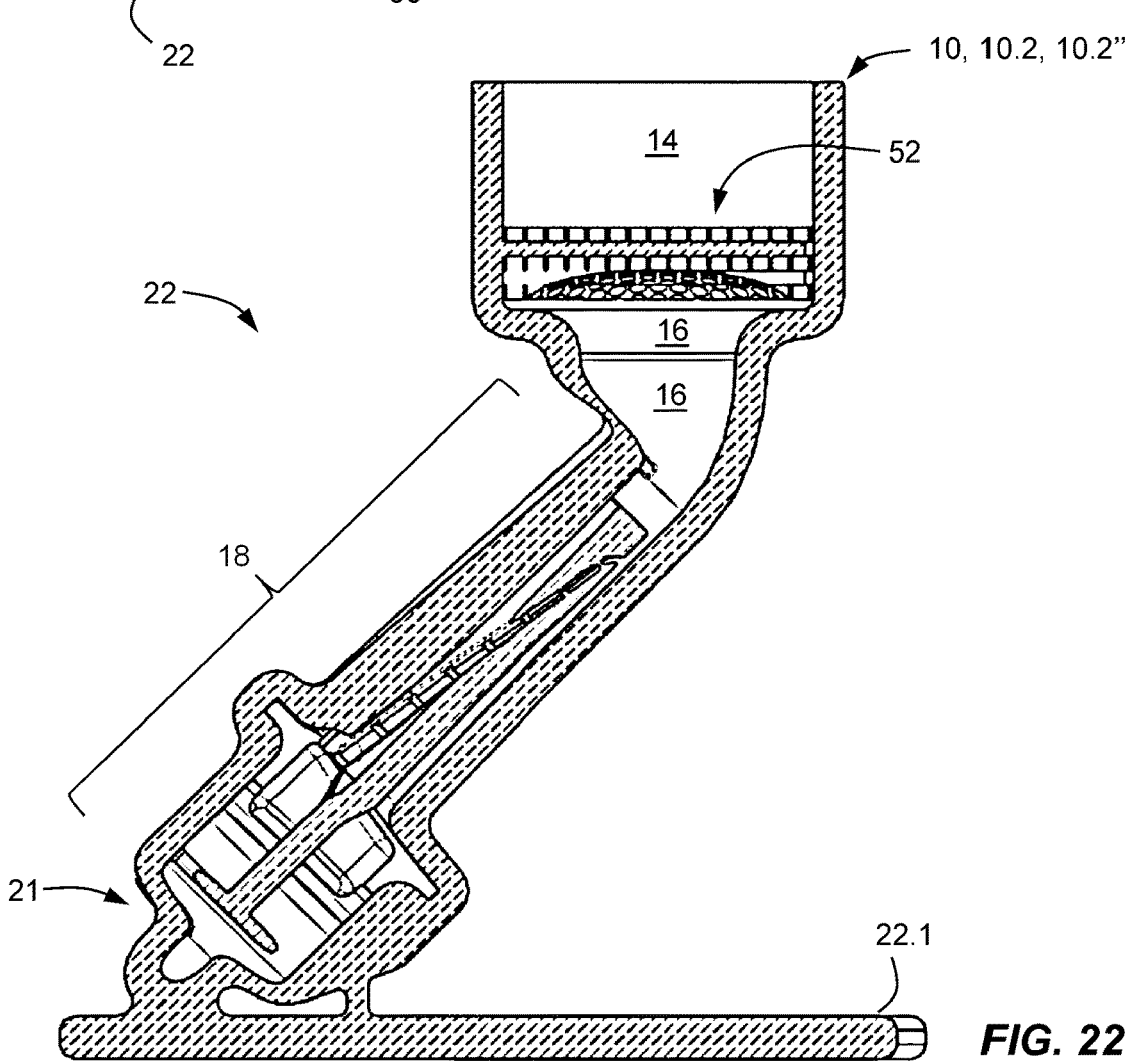
FIG. 22 illustrates a cross-sectional elevation view of the second embodiment of the second aspect of the metal-casting mold illustrated in FIG. 21.

Referring to FIGS. 21-22, a second embodiment of the second aspect of the additively-formed metal-casting mold 10, 10.2", is the same as the above-described first embodiment of the of metal-casting mold 10, 10.2', except for the added incorporation of a molten-metal filter 52 at the base of the ingot-cup portion 14. For example, the molten-metal filter 52 may be constructed to have a geometry akin to that of an open-cell foam, wherein the molten metal 30' passing therethrough would take a multitude of tortuous, interconnecting paths. Alternatively, the molten-metal filter 52 could be of a simpler construction consisting of a bundle of parallel tubes of controlled diameter, effectively limiting the flow velocity using fluid friction. Further alternatively, the molten-metal filter 52 could comprise either a single mesh or a plurality of meshes, having openings that are sufficiently small so as to provide for substantially laminar flow therethrough. The molten-metal filter 52 can be either constructed as a separate and distinct element that is subsequently placed in the metal-casting mold 10, 10.2", or constructed as an integral part of the metal-casting mold 10, 10.2" during the associated additive manufacturing process.

The molten-metal filter 52 provides for reducing the velocity of the molten metal 30' filling the component-mold portion 18 of the metal-casting mold 10, 10.2" during step (1712) of the associated metal-casting process 1700, which provides for reducing turbulence of the molten metal 30' across the detailed features within the component-mold portion 18 so as to provide for improving the quality of the resulting casting, particularly if the latter incorporates relatively fine features. The molten-metal filter 52 can also provide for removing contaminants from the molten metal 30' if the associated metal ingot 30 is not sufficiently pure. It should be understood that the first aspect of the metal-casting mold 10, 10.1 could also incorporate a molten-metal filter 52 at the base of the ingot-cup portion 14, and that a molten-metal filter 52 could be utilized in cooperation with either the first or second aspects of the associated filler-and-riser topology.

It should be understood that the second aspect of the additively-formed metal-casting mold 10 could alternatively be adapted to incorporate the above-described second aspect of the filler-and-riser topology.

Furthermore, for configurations with a plurality of ingot cup 14 and funnel 16 portions, and one or more riser portions 20, with the number of ingot cup 14 and funnel 16 portions either equal or different from the number of riser portions 20, in accordance with a third aspect of an associated filler-and-riser topology, first subset of one or more ingot cup 14 and funnel 16 portions provide for directly feeding the component-mold portion 18, and a remaining second subset of one or more ingot cup 14 and funnel 16 portions provide for directly feeding a corresponding subset of one or more riser portions 20.

The above-described integral metal-casting molds 10 provide for casting a single component without requiring a plurality of sprues and risers, and without requiring gating, so as to provide for improved material utilization and more efficient mold construction than in comparison with traditional casting processes. For example, in the case of a particular turbine blade, the material utilization rate as a result of the elimination of unnecessary sprues and gates is predicted to increase from 20% to 60%.

The above-described metal-casting processes 100, 1700 can be applied to a wide variety of components, including, but not limited to, turbine blades and airfoils as illustrated. For example, the above-described metal-casting processes 100, 1700 would be well suited to any part with complex or delicate features (e.g. thin walls or small cores), including, but not limited to, airframe brackets, louvers, cam controls, heat sinks, biomedical components, and so forth. Furthermore, the above-described metal-casting processes 100, 1700 can be used with a wide variety of metals, including, but not limited to, nickel and cobalt based equiax alloys or super-alloys that are vacuum melted and that provide for individual grain dimensions that are approximately equal along all axes.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A metal casting method, comprising:
   a. loading at least one solid-metal ingot into at least one ingot-cup portion of an integrally-formed metal-casting mold, wherein said integrally-formed metal-casting mold comprises:
      i. said at least one ingot-cup portion, wherein said at least one ingot-cup portion provides for receiving said at least one solid-metal ingot, and a total volume of said at least one solid-metal ingot is sufficient to provide for casting a part in said integrally-formed metal-casting mold;
      ii. at least one funnel portion operatively coupled to and below said at least one ingot-cup portion, wherein an inlet of said at least one funnel portion provides for receiving molten metal of and melted from said at least one solid-metal ingot, an outlet of said at least one funnel portion provides for discharging said molten metal under action of gravity, and said inlet of said at least one funnel portion is wider than said outlet of said at least one funnel portion;
      iii. a component-mold portion configured to form said part from said molten metal, wherein said component-mold portion comprises at least one inlet for receiving said molten metal, and an outlet for discharging said molten metal in excess of an amount needed to form said part; and
      iv. at least one riser portion, wherein each said at least one riser portion comprises a corresponding first fluid conduit extending from a base of said component-mold portion to a first location above a top of said component-mold portion, and either each said outlet of said at least one funnel portion is operatively coupled to a corresponding said at least one inlet of said component-mold portion at or proximate to said top of said component-mold portion, and said at least one riser portion is operatively coupled to said outlet of said component-mold portion at a base of said component-mold portion; or each said outlet of said at least one funnel portion is operatively coupled to a corresponding riser portion of said at least one riser portion at a second location above said top of said component-mold portion, and a second fluid conduit is operatively coupled to said outlet of said component-mold portion at or proximate to said top of said component-mold portion;
   b. heating said integrally-formed metal-casting mold loaded with said at least one solid-metal ingot within a furnace, under a vacuum, to a temperature sufficient to melt said at least one solid-metal ingot in said at least one ingot-cup portion so as to generate said molten metal of and melted from said at least one solid-metal ingot; and
   c. casting said part with said molten metal, wherein said molten metal flows from said at least one ingot-cup portion through said at least one funnel portion into said component-mold portion, and said molten metal in excess of said amount needed to form said part either flows from said component-mold portion either into said at least one riser portion or into said second fluid conduit.

2. A metal casting method as recited in claim 1, further comprising forming said integrally-formed metal-casting mold from an integrally-formed pattern that is removed from said integrally-formed metal-casting mold prior to commencing the metal casting method of claim 1.

3. A metal casting method as recited in claim 2, further comprising forming said integrally-formed pattern directly by direct additive manufacturing.

4. A metal casting method as recited in claim 1, further comprising forming said integrally-formed metal-casting mold by direct additive manufacturing.

5. A metal casting method as recited in claim 4, further comprising incorporating at least one integrally-formed molten metal filter located in series with said at least one ingot-cup portion and a corresponding said at least one funnel portion, or located within either or both said at least one ingot-cup portion or said corresponding said at least one funnel portion.

6. A metal casting method as recited in claim 1, wherein said vacuum is sufficient so that the pressure in said furnace is not in excess of one millitorr.

7. A metal casting method as recited in claim 1, wherein said furnace comprises an induction furnace.

8. A metal casting method as recited in claim 7, further comprising placing said integrally-formed metal-casting mold loaded with said at least one solid-metal ingot within a susceptor within said induction furnace.

9. A metal casting method as recited in claim 7, wherein the operation of heating said integrally-formed metal-casting mold loaded with said at least one solid-metal ingot in said induction furnace comprises:
   a. initially heating said furnace to a temperature in a range of about 11 to 56 degrees Celsius (20 to 100 degrees Fahrenheit) below a lower bound of a melting range of said solid-metal ingot for a first dwell period sufficient to achieve a substantially uniform temperature throughout said integrally-formed metal-casting mold and said at least one solid-metal ingot;
   b. increasing said temperature of said furnace to temperature in a range of about 11 to 56 degrees Celsius (20 to 100 degrees Fahrenheit) above an upper bound of said melting range of said solid-metal ingot; and
   c. holding said temperature of said furnace for a second dwell period sufficient to provide for filling said component-mold portion of said integrally-formed metal-casting mold with said molten metal.

10. A metal casting method as recited in claim 9, further comprising cooling said integrally-formed metal-casting mold following step c of claim 9, wherein during the operation of cooling said integrally-formed metal-casting mold, said integrally-formed metal-casting mold is exposed to either a vacuum with radiative cooling, ambient air or gas, or forced air or gas cooling.

11. A metal casting method as recited in claim 1, wherein a volume of said at least one ingot-cup portion, alone or in combination with said at least one funnel portion, is sufficient to hold a volume of solid metal sufficient to fill said integrally-formed metal-casting mold with an amount of metal sufficient to fill said component-mold portion with said molten metal.

12. A metal casting method as recited in claim 1, wherein said molten metal flows through a molten-metal filter prior to flowing into said component-mold portion, so as to provide for either or both filtering impurities from said molten metal or impeding the flow of said molten metal into said component-mold portion of said integrally-formed metal-casting mold.

13. A metal casting method as recited in claim 1, wherein said component-mold portion is fed from above with said molten metal from said at least one funnel portion, and a top of said at least one riser portion is vented.

14. A metal casting method as recited in claim 1, wherein said component-mold portion is fed from above with said molten metal from said funnel portion, and said at least one riser portion is closed.

15. A metal casting method as recited in claim 1, wherein said component-mold portion is fed from above with said molten metal from said funnel portion, and a ratio of surface area to volume of said at least one riser portion is less than a corresponding ratio of surface area to volume of a portion of said component-mold portion proximate to said at least one riser portion.

16. A metal casting method as recited in claim 1, wherein said component-mold portion is fed from below with said molten metal from said at least one riser portion.

17. A metal casting method as recited in claim 16, wherein said top of said component-mold portion is vented through said second fluid conduit.

18. A metal casting method as recited in claim 1, wherein said at least one ingot-cup portion comprises a plurality of ingot-cup portions, said at least one funnel portion comprises a corresponding plurality of funnel portions in one-to-one association with said plurality of ingot-cup portions, and each said outlet of a different funnel portion of said plurality of funnel portions is in fluid communication with a different portion of said component-mold portion.

19. A metal casting method as recited in claim 1, wherein said at least one ingot-cup portion comprises a plurality of ingot-cup portions, said at least one funnel portion comprises a corresponding plurality of funnel portions in one-to-one association with said plurality of ingot-cup portions, said at least one riser portion comprises a corresponding plurality of riser portions in one-to-one association with said plurality of funnel portions, and each said outlet of a different funnel portion of said plurality of funnel portions is in fluid communication with a top of a different riser portion.

20. A metal casting method as recited in claim 1, further comprising impeding a flow of said molten metal into said component-mold portion of said integrally-formed metal-casting mold.

21. A metal casting method as recited in claim 20, wherein the operation of impeding said flow of said molten metal into said component-mold portion of said integrally-formed metal-casting mold comprises inclining said component-mold portion in said furnace.

22. A metal casting method as recited in claim 20, wherein said component-mold portion is fed from below with said molten metal from said at least one riser portion, and the operation of impeding said flow of said molten metal into said component-mold portion of said integrally-formed metal-casting mold comprises restricting a corresponding flow of said molten metal within said at least one riser portion of said integrally-formed metal-casting mold.

23. A metal casting method as recited in claim 22, wherein the operation of restricting said flow of said molten metal within said at least one riser portion of said integrally-formed metal-casting mold is by restricting an inside diameter of at least a portion of said first fluid conduit of said at least one riser portion of said integrally-formed metal-casting mold.

24. A metal casting method as recited in claim 23, wherein a cross-sectional area of said portion of said first fluid conduit of said at least one riser portion is not in excess of half the minimum cross-sectional area of the flow path between said at least one ingot-cup portion and said component-mold portion.

25. A metal casting method as recited in claim 20, wherein the operation of impeding said flow of said molten metal into said component-mold portion comprises controlling a rate at which said at least one solid-metal ingot is melted.

26. A metal casting method as recited in claim 25, wherein said rate at which said at least one solid-metal ingot is melted is controlled by scheduling a heat flux from a susceptor to correspond to a height level of said molten metal within said component-mold portion and an associated height-level-dependent nature of the associated part features of said component-mold portion, wherein said heat flux from said susceptor is controlled by controlling a flow of power to an induction coil associated therewith.

* * * * *